US012286835B1

(12) United States Patent
Labuda

(10) Patent No.: US 12,286,835 B1
(45) Date of Patent: Apr. 29, 2025

(54) WINDOW VENTILATION AND INSERT ARRANGEMENT

(71) Applicant: John G. Labuda, Hoffman Estates, IL (US)

(72) Inventor: John G. Labuda, Hoffman Estates, IL (US)

( * ) Notice: Subject to any disclaimer, the term of this patent is extended or adjusted under 35 U.S.C. 154(b) by 0 days.

(21) Appl. No.: 18/906,521

(22) Filed: Oct. 4, 2024

(51) Int. Cl.
*E06B 7/02* (2006.01)
*E06B 7/03* (2006.01)
*E06B 7/10* (2006.01)
*E06B 7/082* (2006.01)

(52) U.S. Cl.
CPC .................. *E06B 7/02* (2013.01); *E06B 7/03* (2013.01); *E06B 7/082* (2013.01); *E06B 7/10* (2013.01)

(58) Field of Classification Search
None
See application file for complete search history.

(56) References Cited

U.S. PATENT DOCUMENTS 2,095,645 A * 10/1937 Lewis ...................... A47K 3/34 4/607
2,228,224 A * 1/1941 Benson ................... F24F 7/013 49/89.1
2,498,095 A * 2/1950 Risney ...................... E06B 7/26 160/90
2,647,571 A * 8/1953 Landry ................. E06B 3/2605 160/90
3,261,129 A * 7/1966 Brydolf ............... E05D 15/0626 16/93 R
3,653,157 A * 4/1972 Casebolt ................... E06B 3/02 16/93 R
3,654,733 A * 4/1972 Blackwell ................. E06B 7/32 49/67
3,698,308 A * 10/1972 Navara ..................... E06B 7/03 55/385.2
3,787,936 A * 1/1974 Rystad ................ E05D 15/0656 49/411
3,830,146 A * 8/1974 Kaiser ..................... F24F 13/12 160/90
3,911,803 A * 10/1975 Kong ........................ E06B 7/03 62/262
3,942,576 A * 3/1976 Rickard .................... E06B 7/03 D25/48.8

(Continued)

*Primary Examiner* — Phi D A
(74) *Attorney, Agent, or Firm* — Christopher J. Scott

(57) ABSTRACT

A window ventilation arrangement includes a window assembly and a window insert arrangement. The window assembly includes a window frame and a slidable window. The frame includes an insert-receiving channel and is configured to provide an air-letting opening. The slidable window is displaceable within the window channel portion so as to provide the air-letting opening. The window insert arrangement includes a panel and a plurality of panel spacers. The panel has four corners, a first panel edge, a second panel edge, and a panel thickness. The panel spacers are attached to the panel at least at the four corners for providing an overall insert thickness equaling an insert channel width of an insert-receiving channel of the slidable window. The window insert arrangement is insertable into the insert-receiving channel of the slidable window and exposed portions of the panel providing a reduced, air-letting opening for reductively ventilating the room.

22 Claims, 15 Drawing Sheets

(56) References Cited

U.S. PATENT DOCUMENTS

| | | | | | |
|---|---|---|---|---|---|
| 4,033,073 | A * | 7/1977 | Bogan | E06B 7/082 | 160/222 |
| 4,267,874 | A * | 5/1981 | Pope | E06B 7/03 | 160/92 |
| 4,358,863 | A * | 11/1982 | Jacobsen | A47K 3/34 | 49/411 |
| 4,445,239 | A * | 5/1984 | Jacobsen | A47K 3/34 | 4/607 |
| 4,453,456 | A * | 6/1984 | Szkudlarek | E06B 7/02 | 160/91 |
| 4,769,949 | A * | 9/1988 | Glendowne | A47K 3/34 | 4/557 |
| 4,868,935 | A * | 9/1989 | Van Weelden | A47K 3/34 | 16/93 R |
| 5,016,390 | A * | 5/1991 | Johnson | E06B 7/082 | 49/38 |
| 5,035,116 | A * | 7/1991 | Main | F24F 1/027 | 62/262 |
| 5,155,936 | A * | 10/1992 | Johnson | E06B 9/15 | 49/354 |
| 5,468,185 | A * | 11/1995 | Truitt | E06B 7/10 | 454/198 |
| 5,501,041 | A * | 3/1996 | Fischbeck | E06B 7/03 | 49/55 |
| 5,598,665 | A * | 2/1997 | Guddas | E06B 3/4609 | 49/404 |
| 5,713,167 | A * | 2/1998 | Durham | E06B 1/345 | 52/204.67 |
| 5,860,465 | A * | 1/1999 | Eastridge | E06B 3/485 | 160/113 |
| 5,893,181 | A * | 4/1999 | Moncaster | E05D 15/0643 | 4/557 |
| 7,021,007 | B2 * | 4/2006 | Jacobs | E05D 15/0691 | 16/97 |
| 9,334,685 | B1 * | 5/2016 | DeMoore | E06B 7/03 | |
| 10,301,869 | B1 * | 5/2019 | Crittenden | E06B 7/10 | |
| 2005/0166496 | A1 * | 8/2005 | Farag | B32B 17/10807 | 52/582.1 |
| 2005/0274464 | A1 * | 12/2005 | McCracken | B60J 1/2011 | 160/105 |
| 2007/0161345 | A1 * | 7/2007 | Chato | E06B 7/02 | 454/195 |
| 2009/0173012 | A1 * | 7/2009 | Luca | E05F 5/003 | 49/506 |
| 2010/0197214 | A1 * | 8/2010 | Geremia, Sr. | F24F 13/18 | 454/251 |
| 2011/0011002 | A1 * | 1/2011 | Guillemette | E06B 3/5063 | 49/394 |
| 2012/0000142 | A1 * | 1/2012 | McKimmy | E04B 1/34321 | 52/302.1 |
| 2012/0080153 | A1 * | 4/2012 | Croteau | E06B 7/03 | 160/181 |
| 2012/0090344 | A1 * | 4/2012 | Cho | E06B 7/03 | 62/262 |
| 2012/0318475 | A1 * | 12/2012 | Glover | F24F 5/0017 | 165/47 |
| 2013/0097935 | A1 * | 4/2013 | Sprague | E05D 15/0665 | 49/506 |
| 2017/0226786 | A1 * | 8/2017 | Mayer | E05D 15/063 | |
| 2018/0049598 | A1 * | 2/2018 | Austin, III | A47K 3/34 | |
| 2018/0313571 | A1 * | 11/2018 | Carme | G10K 11/17861 | |
| 2018/0320925 | A1 * | 11/2018 | Carme | G10K 11/1783 | |
| 2019/0009652 | A1 * | 1/2019 | Stallworth | E06B 9/02 | |
| 2019/0106933 | A1 * | 4/2019 | O'Leary | E06B 7/32 | |
| 2019/0338984 | A1 * | 11/2019 | Fang | E06B 7/082 | |
| 2020/0347599 | A1 * | 11/2020 | Lukito | B66B 11/0005 | |
| 2021/0198938 | A1 * | 7/2021 | Pedersen | E06B 3/5864 | |
| 2021/0230933 | A1 * | 7/2021 | Hodges | E06B 3/24 | |
| 2021/0355724 | A1 * | 11/2021 | Brown | E05B 65/0888 | |
| 2022/0081961 | A1 * | 3/2022 | Özden | E06B 7/2305 | |
| 2022/0356711 | A1 * | 11/2022 | Robinson | H02S 20/26 | |
| 2023/0160256 | A1 * | 5/2023 | Isaacs | E04D 13/0315 | 52/202 |

* cited by examiner

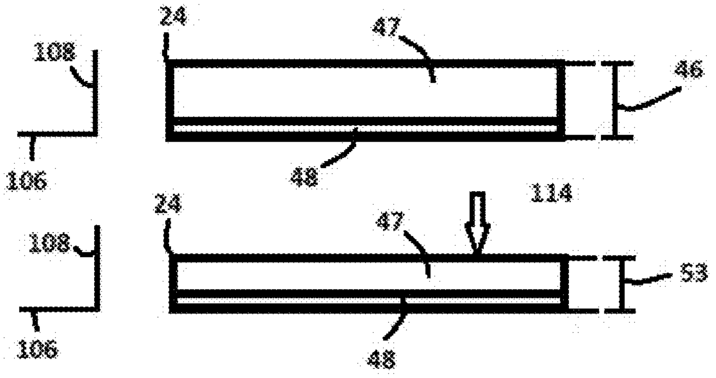
FIG. 12A
FIG. 12B
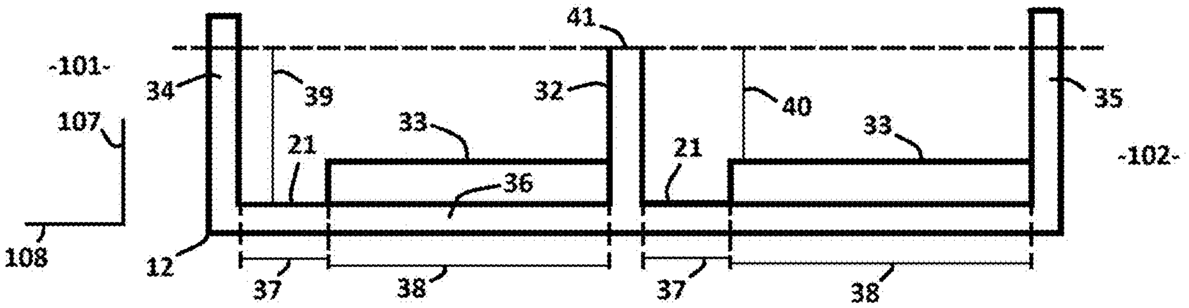
FIG. 13
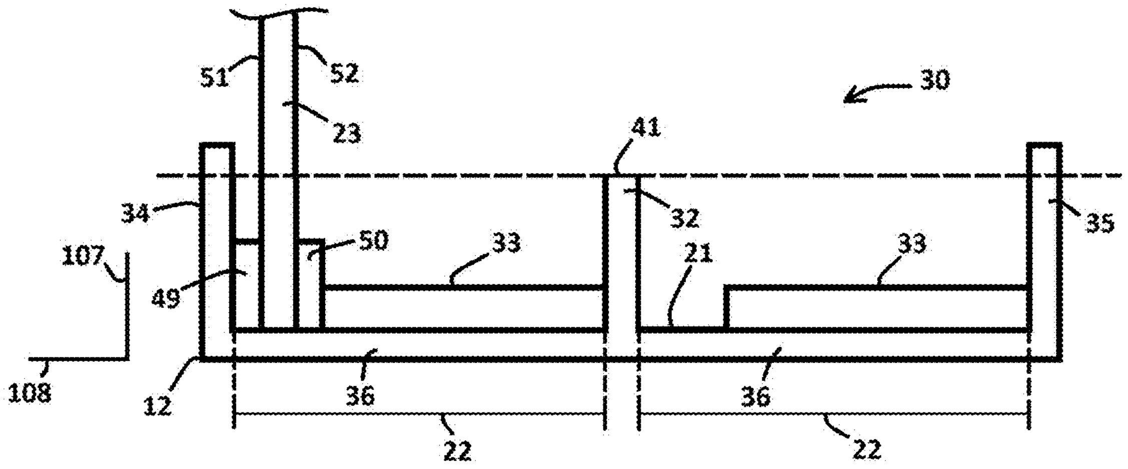
FIG. 14

WINDOW VENTILATION AND INSERT ARRANGEMENT

FIELD OF THE INVENTION

The present invention generally relates to a ventilation system for occupant rooms, and more particularly to a window ventilation arrangement incorporating specific structural components to enhance ventilation of a window, and in the process control ambient temperatures and air quality within those rooms.

BRIEF DESCRIPTION OF THE PRIOR ART

A common problem associated with newly acquired living quarters is poor ventilation of certain rooms within the living quarters and particularly certain rooms within the living space. Moisture, mold, and cold temperatures are typically prevalent in such installations, and space or other heaters alone are insufficient to properly remedy the problem. A system or ensemble enabling a user to outfit or retrofit existing installations with a particular set of components to improve ventilation is a perceived need in the art. Such a system or ensemble, when retrofit into existing construction, solves the problem of high humidity or moisture within the room, improves temperature characteristics during extreme temperature fluctuations, and helps support a healthier, more comfortable living environment.

U.S. Pat. No. 5,862,981, issued to Weng, discloses a Ventilation Control Device for a Bathroom and is believed to be exemplary teaching in the field of room ventilation art. The '981 patent describes a ventilation control device disposed in a bathroom, which ventilation control device operates according to particular methodology then considered novel and inventive as compared to the state-of-the-art at that time. The ventilation control device has a switch board, a controller connected to the switch board, a sensor connected to the controller, and a fan motor connected to the controller. The controller outputs a signal to initiate the fan motor to change a rotating speed.

US Patent Application Publication No. 2007/0294809, authored by Yin, et al. describes a Bathroom Ventilating Device. The bathroom ventilating device by Yin, et al. includes one or more air inlet openings formed in a ceiling of a bathroom for introducing an air into the bathroom, and an air evacuating device disposed on a floor of the bathroom for evacuating odor and moisture from the bathroom. An air drawing device is attached to the ceiling of the bathroom and includes a fan aligned with the air inlet opening of the ceiling for drawing the air into the bathroom for effectively circulating and drawing the air out of the bathroom and for effectively circulating and introducing the fresh air into the bathroom and for effectively removing the odor and the moisture from the bathroom.

SUMMARY OF THE INVENTION

Having considered these and other prior art, the prior art perceives a need for a window ventilation arrangement including particularized components of finer distinction. Central to the practice of the present invention is a window insert arrangement configured to cooperate with a slidable window assembly. There is provided according to one aspect of the presently disclosed subject matter a window ventilation arrangement for ventilating a room. The window ventilation arrangement comprises a slidable window assembly and a window insert arrangement.

The slidable window assembly comprises a window frame and a slidable window. The window frame comprises a window channel portion and an insert-receiving channel and is configured to provide an air-letting opening extending in a first dimension and a second dimension. The slidable window is displaceable in a first direction and a second direction along at least one of the first and second dimensions within the window channel portion so as to provide the air-letting opening or close the air-letting opening. The insert-receiving channel has an insert channel width.

The window insert arrangement comprises a panel and a plurality of panel spacers. The panel comprises four corners, a first panel edge, a second panel edge opposite the first panel edge, and a panel thickness. The panel spacers are attached to the panel at least at the four corners for providing an insert thickness, which insert thickness equals the insert channel width. The window insert arrangement is insertable into the insert-receiving channel such that panel provides a reduced air-letting opening for reductively ventilating the room.

In some embodiments, the plurality of spacer elements numbers at least eight and comprise an array of outer spacer elements and an array of inner spacer elements. The outer spacer elements are attached to the four corners at an exterior panel side of the panel and the inner spacer elements are attached to the four corners at an interior panel side of the panel. In some embodiments, the panel has a panel length and a panel width. The panel width extends intermediate the first panel edge and the second panel edge, and the panel length extends intermediate a third panel edge and a fourth panel edge. In some embodiments, the panel length is greater than the panel width.

In some embodiments, the plurality of spacer elements comprises at least one mid-length spacer element. The at least one mid-length spacer element is attachable at the first panel edge intermediate the third and fourth panel edges. In some embodiments, the window insert arrangement is displaceable in the first direction and the second direction along at least one of the first and second dimensions within the insert-receiving channel so as to displace the reduced air-letting opening along at least one of the first and second dimensions.

In some embodiments, the window frame comprises a first frame edge and a second frame edge opposite the first frame edge. In some embodiments, the first panel edge of the panel is positionable against the first frame edge for maximizing the reduced, air-letting opening. In some embodiments, the slidable window comprises a first window edge. The first window edge is displaceable toward the first panel edge so as to provide an air diversion pathway from the reduced air-letting opening toward an air exit between the first window edge and the first frame edge. In some embodiments, the air diversion pathway is adjustable by displacing at least one of the window insert arrangement and the slidable window along at least one of the first dimension and the second dimension.

In some embodiments, the panel spacers each comprise a spacer length and a spacer width. In some embodiments, the panel spacers at the corners of the first panel edge are aligned lengthwise thereat, and the panel spacers at the corners of the second panel edge being aligned lengthwise along the third panel edge and the fourth panel edge. In some embodiments, the window ventilation arrangement may further comprise a plurality of insert spacers. In some embodiments, the insert spacers are positioned at upper panel spacers at the first frame edge for wedging the window insert arrangement thereat.

There is provided in accordance with another aspect of the presently disclosed subject matter a window insert arrangement for outfitting a slidable window assembly. The window insert arrangement comprises a panel and a plurality of panel spacers. The panel comprises four corners, four panel edges, a panel thickness, a panel length, and a panel width. The panel length and the panel width together define an air-blocking area extending in a first dimension and a second dimension.

The panel spacers are attachable to the panel at least at the four corners for providing an insert thickness thereat. The window insert arrangement is insertable into an insert-receiving channel of the slidable window assembly. The air-blocking area reduces an air-letting area of the slidable window assembly to a reduced, air-letting opening for reducing airflow through the air-letting area and for reductively ventilating a room having the slidable window assembly.

In some embodiments, the plurality of spacer elements numbers at least eight and comprise an array of outer spacer elements and an array of inner spacer elements. In some embodiments, the outer spacer elements are attachable to the four corners at an exterior panel side of the panel and the inner spacer elements are attachable to the four corners at an interior panel side of the panel. In some embodiments, the panel width extends intermediate a first panel edge and a second panel edge, and the panel length extends intermediate a third panel edge and a fourth panel edge. In some embodiments, the panel length is greater than the panel width.

In some embodiments, the plurality of spacer elements comprises at least one mid-length spacer element. In some embodiments, the at least one mid-length spacer element is attachable at the first panel edge intermediate the third and fourth panel edges. In some embodiments, the window insert arrangement is displaceable in a first direction and a second direction along at least one of the first and second dimensions within the insert-receiving channel so as to displace the reduced air-letting opening along at least one of the first and second dimensions.

In some embodiments, the slidable window assembly comprises a window frame, the window frame comprising a first frame edge and a second frame edge opposite the first frame edge, a first panel edge of the panel being positionable against the first frame edge for maximizing the reduced, air-letting opening. In some embodiments, the slidable window assembly comprises a slidable window having a first window edge. The first window edge is displaceable toward the first panel edge so as to provide an air diversion pathway from the reduced air-letting opening toward an air exit between the first window edge and the first frame edge. In some embodiments, the air diversion pathway is adjustable by displacing at least one of the window insert arrangement and the slidable window along at least one of the first dimension and the second dimension.

In some embodiments, the panel spacers each comprise a spacer length and a spacer width. In some embodiments, the panel spacers at the corners of the first panel edge are aligned lengthwise thereat, and the panel spacers at the corners of a second panel edge are aligned lengthwise along the third panel edge and the fourth panel edge. In some embodiments, the window insert arrangement may further comprises a plurality of insert spacers. In some embodiments, the insert spacers are positionable at upper panel spacers at the first frame edge for wedging the window insert arrangement thereat.

BRIEF DESCRIPTION OF THE DRAWINGS

Other features and objectives of the presently disclosed subject matter will become more evident from a consideration of the following brief descriptions of patent drawings.

FIG. 12A is a further enlarged, two-dimensional diagrammatic edge depiction of the panel spacer otherwise depicted in FIG. 11B, further enlarged to depict in greater structural detail a layered arrangement of the panel spacer in vertical alignment with the panel spacer depicted in FIG. 12B for ease of comparison.

FIG. 12B is a further enlarged, two-dimensional diagrammatic edge depiction of the panel spacer otherwise depicted in FIG. 11C, further enlarged to depict in greater structural detail the layered arrangement of the panel spacer in vertical alignment with the panel spacer depicted in FIG. 12A for ease of comparison.

FIG. 13 is a first sequential enlarged, two-dimensional diagrammatic sectional depiction of a dual channel arrangement of a frame assembly of the slidable window assembly as viewed along a first viewpoint axis before the window insert arrangement according to the presently disclosed subject matter is inserted therein.

FIG. 14 is a second sequential enlarged, two-dimensional diagrammatic sectional depiction of the dual channel arrangement otherwise depicted in FIG. 13 depicting a fragmentary window insert arrangement according to the presently disclosed subject matter inserted into the dual channel arrangement.

DETAILED DESCRIPTION OF THE EMBODIMENTS

Figure 1:
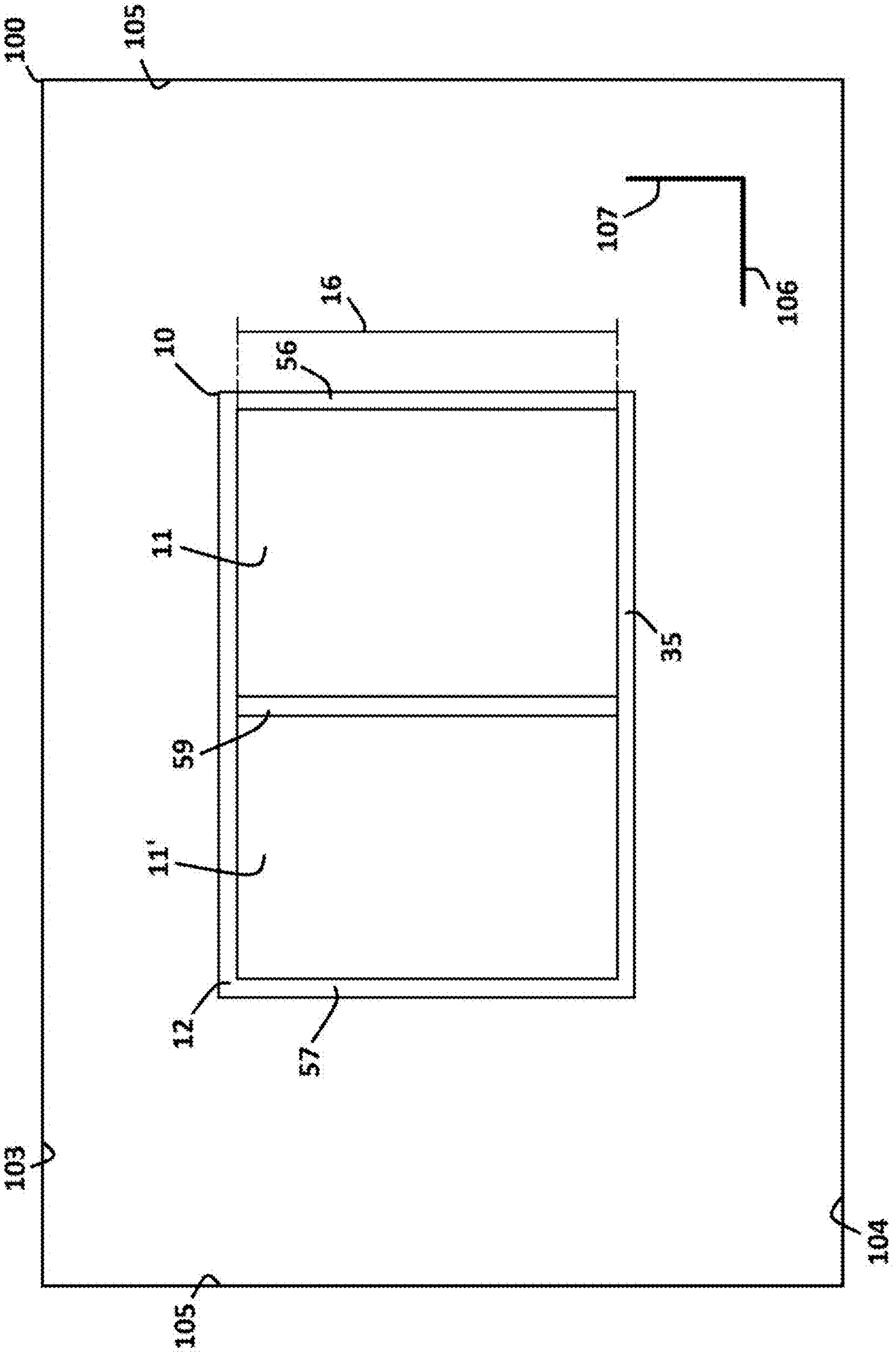
FIG. 1 is a first two-dimensional diagrammatic depiction of a room outfitted with a horizontally oriented slidable window assembly viewed from within a room interior of the room along a first viewpoint axis depicting the slidable window assembly in a closed configuration according to the presently disclosed subject matter.

Referring now to the drawings with more specificity, the following specifications generally describe a system of ventilation or ventilation system for ventilating a room 100 having a slidable window assembly 10 positioned intermediate a room exterior 101 and a room interior 102. In some applications, the room exterior 101 is an outside space open to the elements, and in particular, precipitation as diagrammatically depicted and referenced with a water droplet 120 in FIG. 17. In some applications, the room interior 102 is an occupant dwelling or workspace opposite the outside space, which room interior 102 may be ventilated when the slidable window assembly 10 is directed into an air-letting, open configuration. In this regard, it is noted occupant dwellings or workspaces as at room interior 102 often suffer from poor ventilation resulting in a room characterized by high humidity or moisture content as well as undesirable or inferior ambient air temperature(s) and quality, particularly during colder months of the year.

Figure 2:
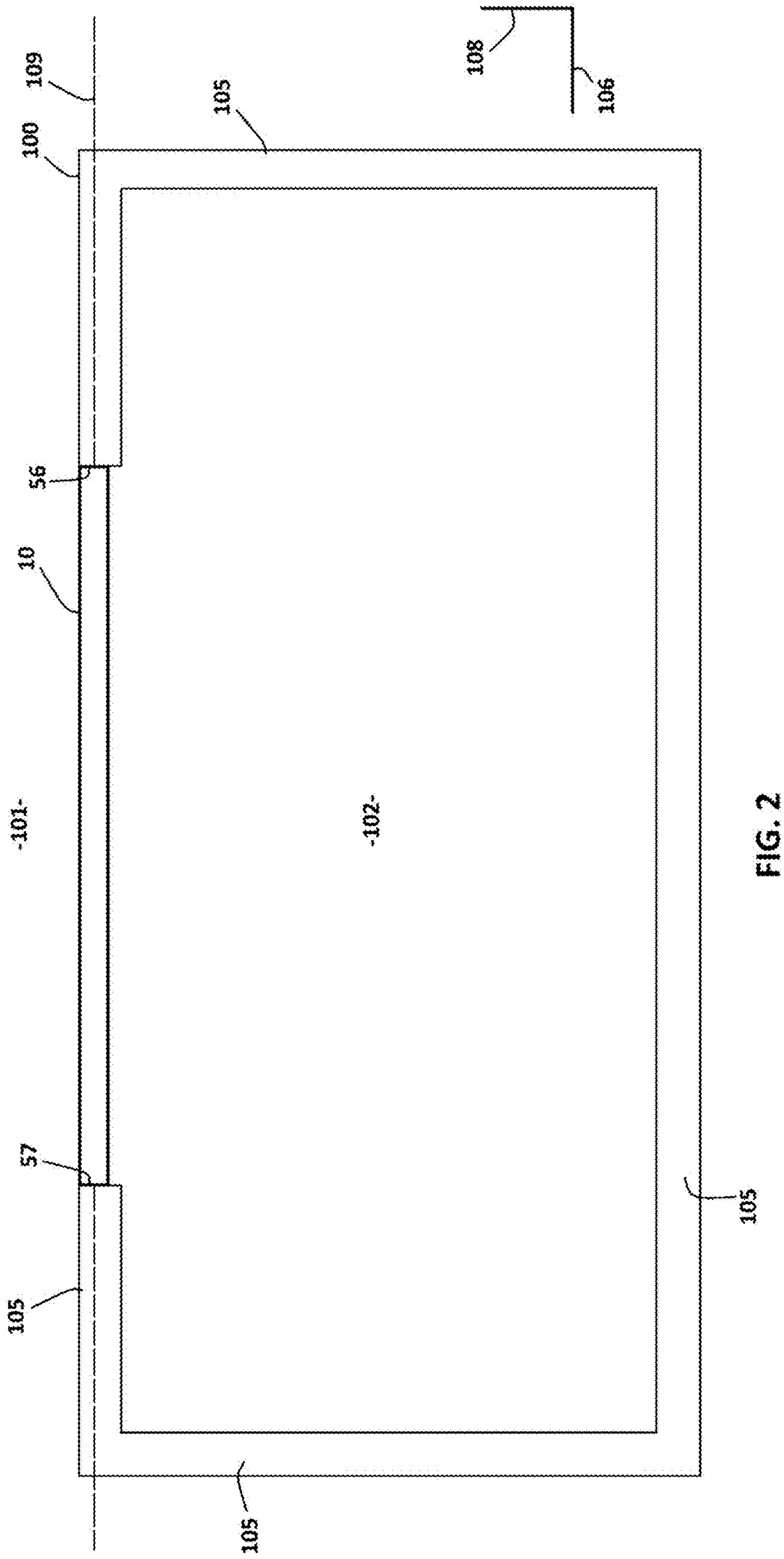
FIG. 2 is a second two-dimensional diagrammatic depiction of the room outfitted with a horizontally oriented slidable window assembly otherwise depicted in FIG. 1 and viewed from a second viewpoint axis orthogonal to the first viewpoint axis.
Figure 3:
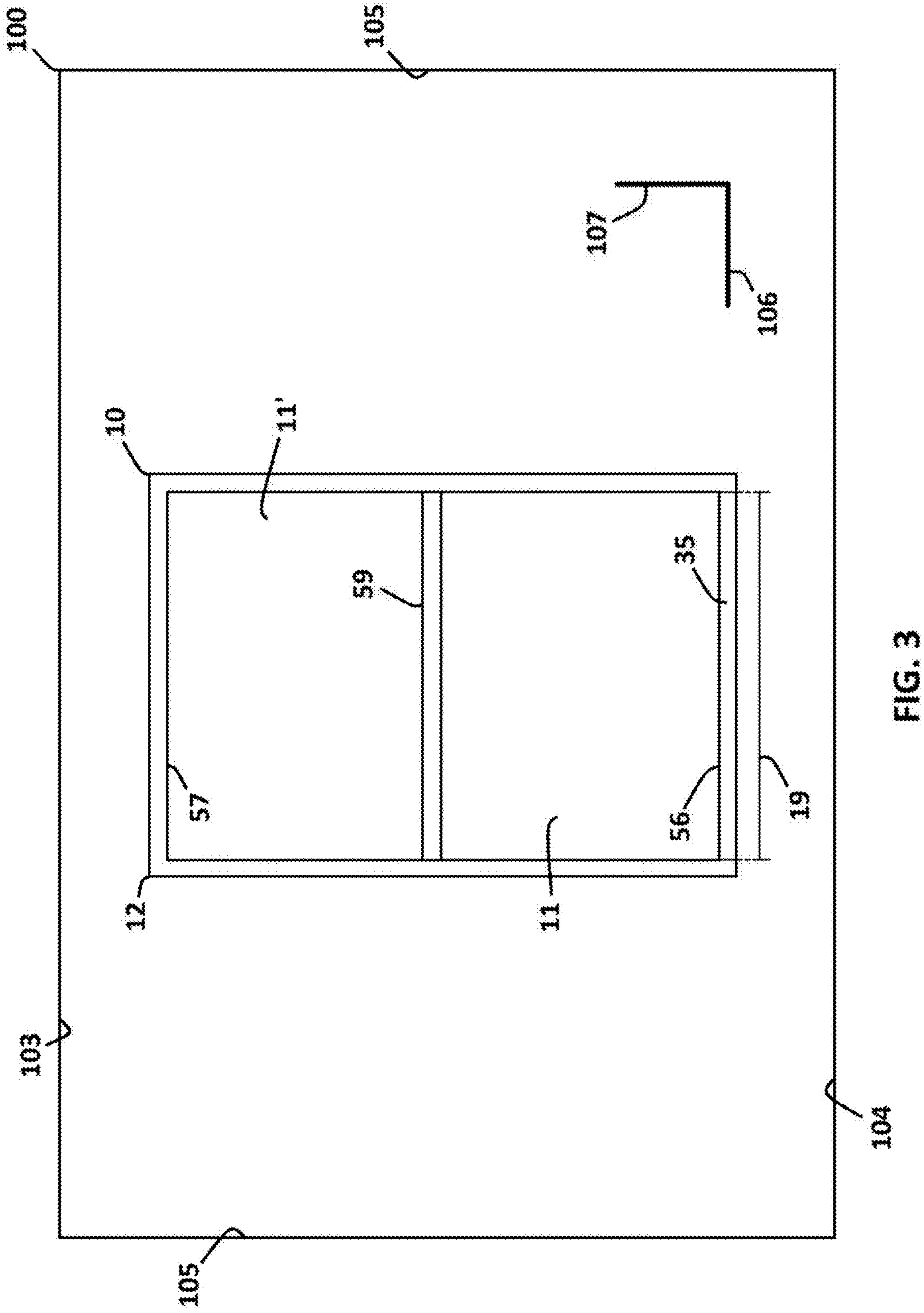
FIG. 3 is a first two-dimensional diagrammatic depiction of a room outfitted with a vertically oriented slidable window assembly viewed from within a room interior of the room along a first viewpoint axis depicting the slidable window assembly in a closed configuration according to the presently disclosed subject matter.

The room 100 according to the presently disclosed subject matter may be said to essentially comprise a room ceiling 103, a room floor 104 and room walls 105 as generally depicted and referenced in FIGS. 1-3. The slidable window assembly 10 is mounted in a room wall 105 providing a barrier between the room exterior 101 and the room interior 102. Comparatively referencing FIGS. 1 and 2, the reader will there respectively consider two-dimension diagrammatic depictions of the room 100. FIG. 1 depicts a slidable window assembly 10 within a room 100 extending along a first dimension as at X axis 106 and along a second dimension as at Y axis 107. FIG. 2 depicts the room 100 extending along the X axis 106 and Z axis 108 such that a window-bearing wall 105 extends along the X axis 106 at an upper portion of the figure; two room-enclosing walls 105 extend from the window-bearing wall along the Z axis 108 toward the lower portion of the figure; and one room-enclosing wall 105 extends along the X axis 106 intermediate the two room-enclosing walls 105 extending along the Z axis 108.

Figure 3A:
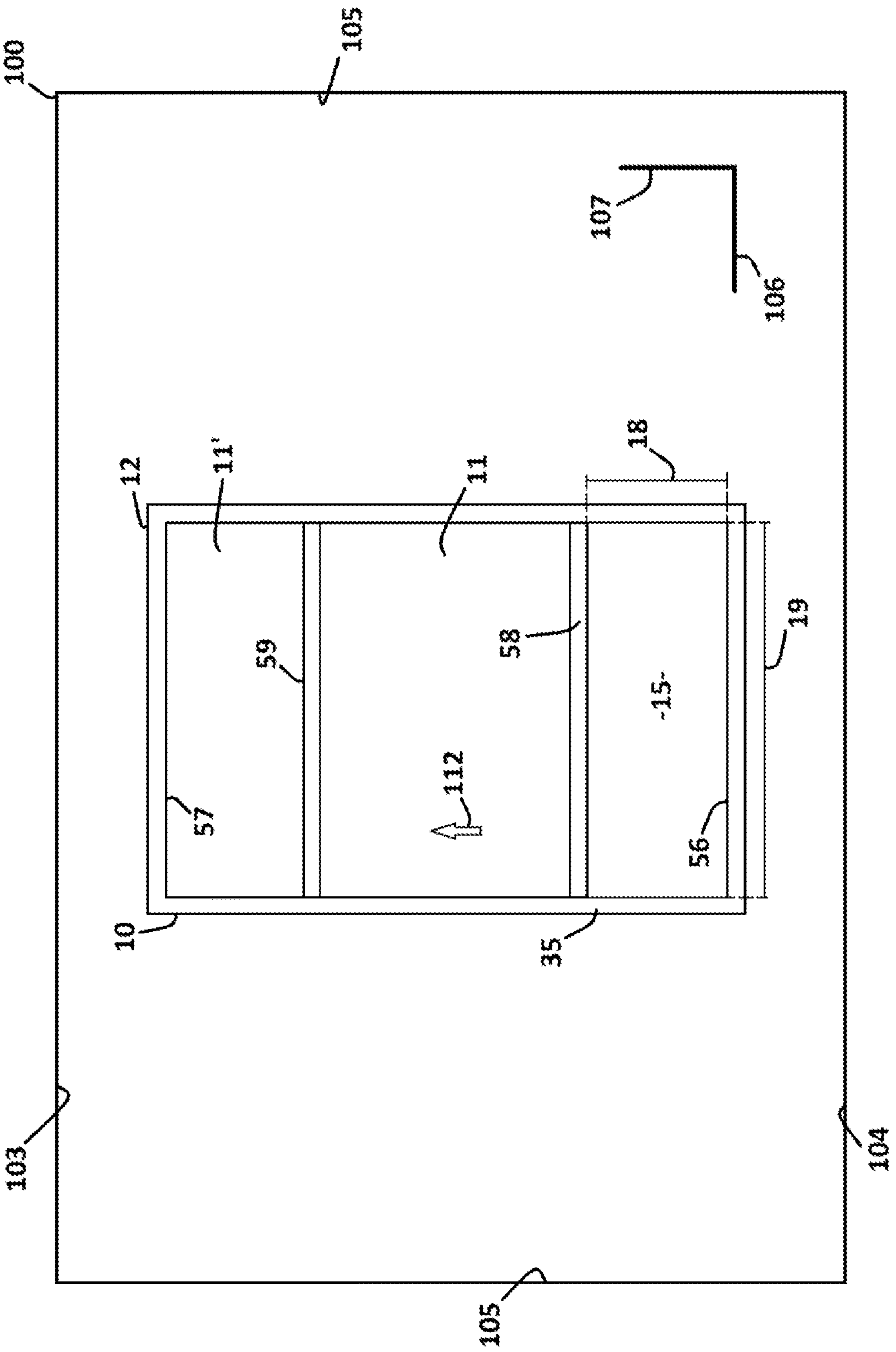
FIG. 3A is a second two-dimensional diagrammatic depiction of the room outfitted with a vertically oriented slidable window assembly otherwise depicted in FIG. 3 depicting the slidable window assembly in a partially open configuration according to the presently disclosed subject matter.

The slidable window assembly 10 depicted in FIGS. 1 and 2 is a horizontally oriented slidable window assembly such that the window length is greater than the window height with the window length extending along the X axis 106 and the window height extending along the Y axis 107. The slidable window assembly 10 extends along a window plane 109 extending along the X axis 106 and Y axis 107 directed out of the page as generally depicted in FIG. 2. The slidable window assembly 10 depicted in FIG. 3 is a vertically oriented slidable window assembly such that the window height is greater than the window width with the window width extending along the X axis 106 and the window height extending along the Y axis 107. FIG. 3A depicts the vertically oriented slidable window assembly 10 in a partially open configuration whereby a slidable window 11 is displaced upwardly in a first direction 112 so as to provide an air-letting opening 15 at the bottom of the vertically oriented slidable window assembly 10.

It will be understood that the presently disclosed subject matter contemplates a window ventilation arrangement 30 that may be used with either a horizontally oriented slidable window assembly 10 or a vertically oriented slidable window assembly 10. For ease of illustration, FIGS. 4-8A depict a horizontally oriented slidable window assembly 10 as an exemplary slidable window assembly 10. Comparatively referencing FIGS. 4-8A, the reader will there consider variations on room ventilation wherein the room interior is referenced at 102 and the room exterior is referenced at 101 with the slidable window assembly 10 being positioned such that the window plane 109 extends along the X axis 106 and the Y axis 107.

Figure 4:
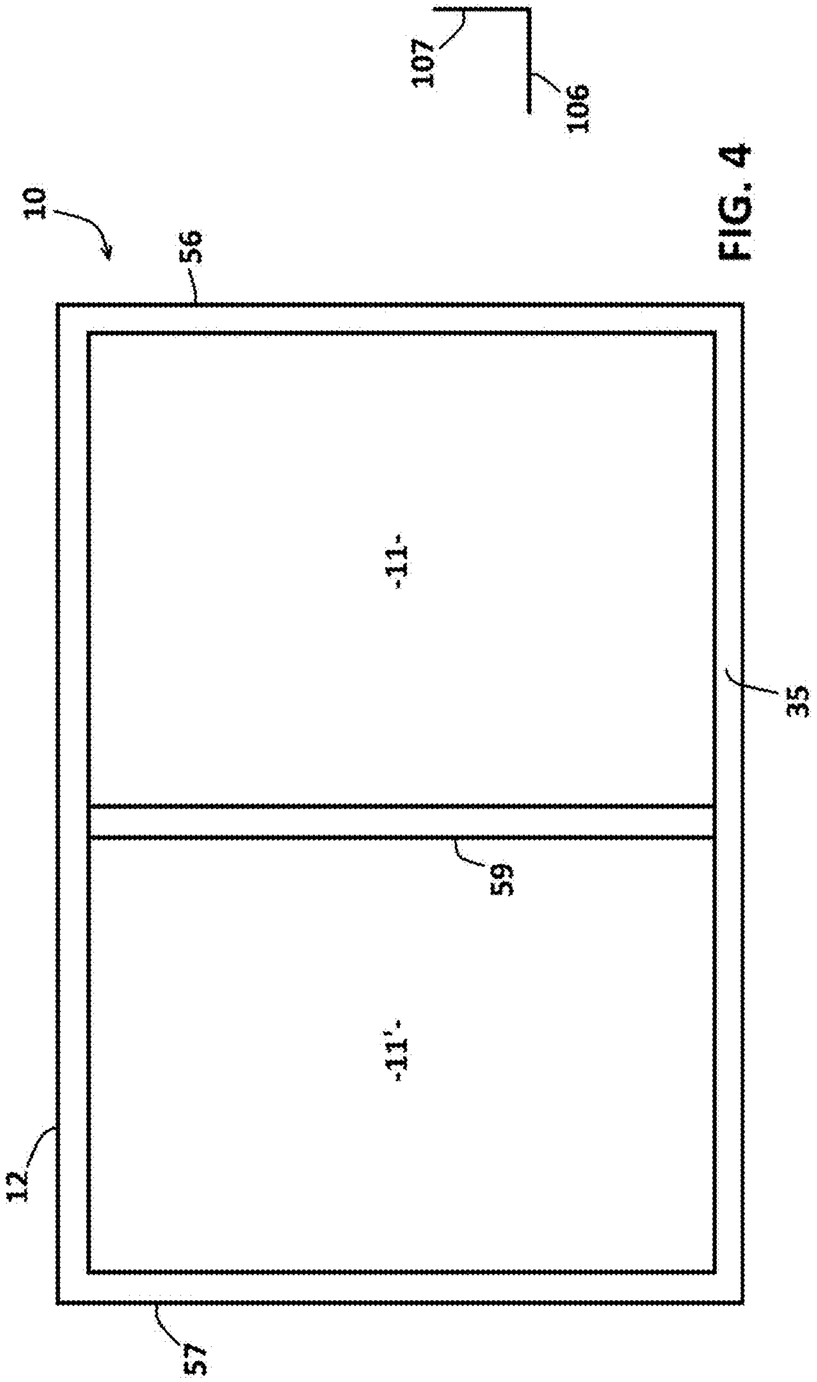
FIG. 4 is a first sequential two-dimensional diagrammatic depiction of a horizontally oriented slidable window assembly as viewed along a first viewpoint axis depicting the slidable window assembly in a closed configuration according to the presently disclosed subject matter.
Figure 4A:
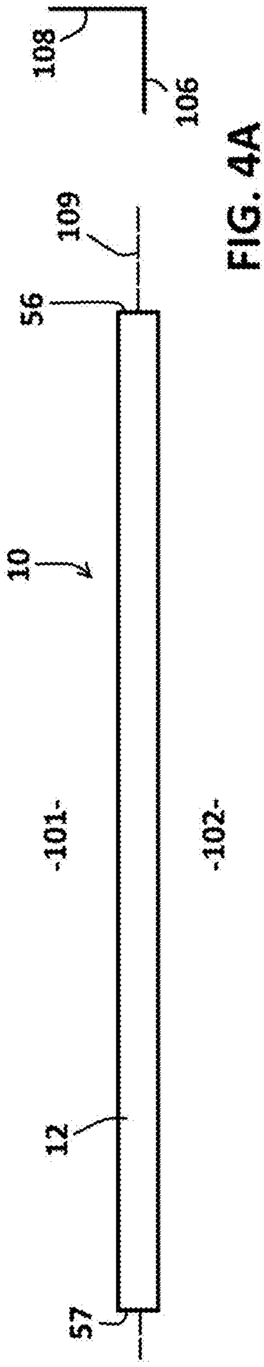
FIG. 4A is a two-dimensional diagrammatic depiction of the horizontally oriented slidable window assembly otherwise depicted in FIG. 4 as viewed along a second viewpoint axis orthogonal to the first viewpoint axis according to the presently disclosed subject matter.

FIGS. 4, 5, 6, 7 and 8 depict the slidable window assembly 10 extending along the X axis 106 and Y axis 107 such that the Z axis extends out of the page; and FIGS. 4A, 5A, 6A, 7A and 8A depict the slidable window assembly 10 extending along the X axis 106 and the Z axis 108 such that the Y axis extends out of the page. Ventilating airflow is referenced at 110 in the various FIGS. 5-8A to help the reader understand how the window ventilation arrangement 30 according to the presently disclosed subject matter operates to direct airflow 110 across the various configurations there depicted. FIGS. 4 and 4A depict the slidable window assembly 10 in a closed configuration such that no airflow 110 is directed through an air-letting opening 15.

In this regard, the presently disclosed subject matter more particularly details a window ventilation arrangement 30 for ventilating a room 100 having a slidable window assembly 10, however oriented. According to another aspect of the presently disclosed subject matter there is provided a window insert arrangement or kit 31 for outfitting a slidable window assembly 10 and providing the window ventilation arrangement 30. In other words, the window insert arrangement 31 according to the presently disclosed subject matter cooperates with a slidable window assembly 10, which slidable window assembly 10 has certain structural characteristics and features. In this regard, the window insert arrangement 31 cooperates with a slidable window assembly 10 essentially characterized by dual channel portions within which at least one slidable window 11 travels as discussed in more detail below.

In some embodiments, the slidable window assembly 10 comprises a rectangular window frame 12 and at least one slidable window 11. In some embodiments, the slidable window assembly 10 may comprise two windows. In those embodiments having two windows, a first window may be fixed to provide a fixed window 11' and a slidable window 11 may be slidably displaced relative to the fixed window 11' within the window frame 12. In some embodiments, both the first and second windows may be displaced relative to one another. For brevity of illustration and understanding, the illustrations submitted in support of these specifications depict a fixed window 11' shown in the left hand position in FIGS. 1, 4, 5, 6, 7 and 8, and the displaceable or slidable window 11 is shown in the right hand position in FIGS. 1, 4, 5, 6, 7 and 8. Other variations prefaced above have not been specifically illustrated; the omission of such illustrations should not be construed as limiting.

Figures 5, 5A:
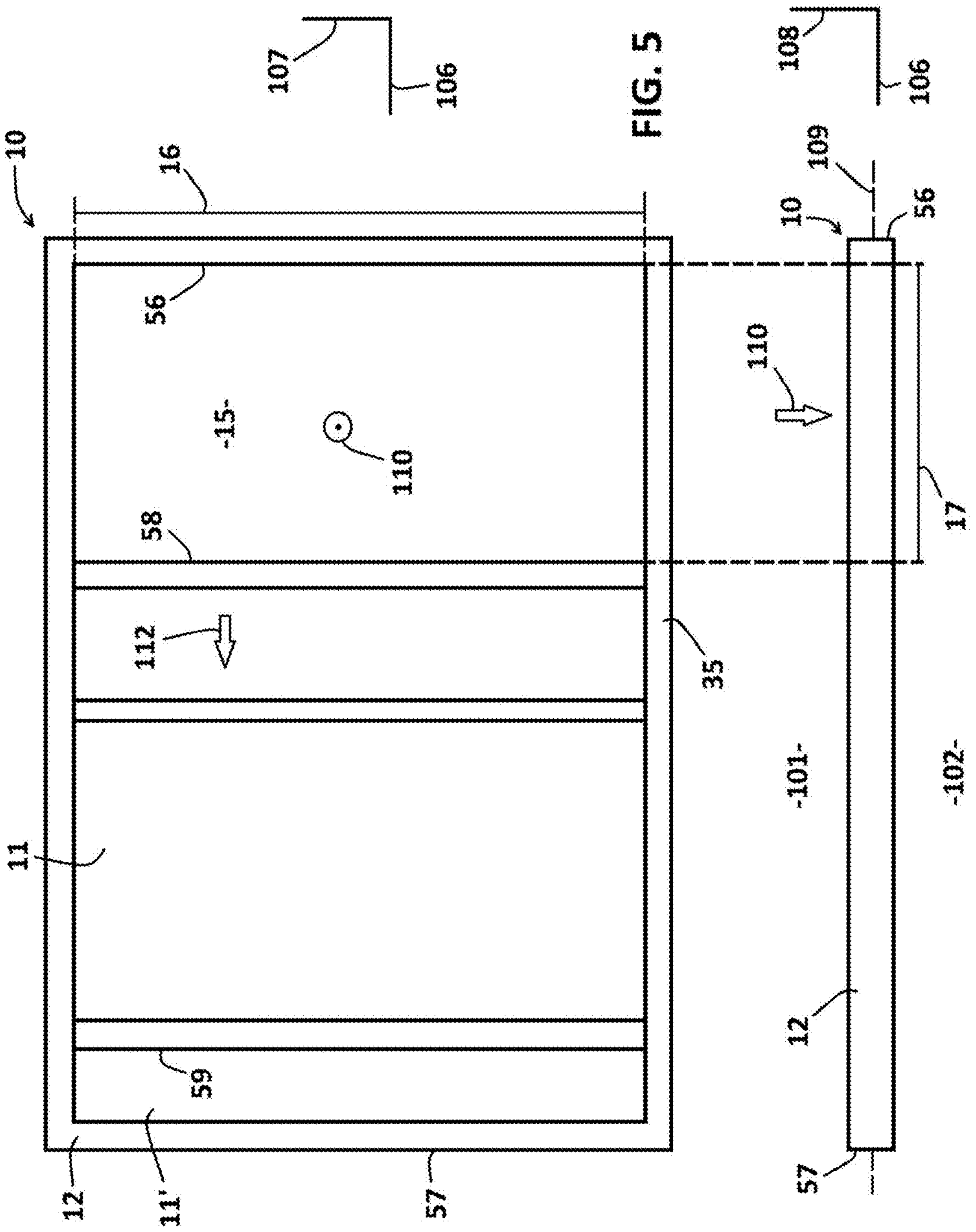
FIG. 5 is a second sequential two-dimensional diagrammatic depiction of the horizontally oriented slidable window assembly otherwise depicted in FIG. 4 as viewed along the first viewpoint axis depicting the slidable window assembly in an open configuration and depicting an airflow through an air-letting opening thereof according to the presently disclosed subject matter.
FIG. 5A is a two-dimensional diagrammatic depiction of the horizontally oriented slidable window assembly otherwise depicted in FIG. 5 as viewed along a second viewpoint axis orthogonal to the first viewpoint axis according to the presently disclosed subject matter.

In some embodiments, the window frame 12 comprises an exterior window channel 13 and an interior window channel 14. In the illustrated example, the fixed window 11' is received in the exterior window channel 13 and the slidable window 11 is received in the interior window channel 14. Together the window frame 12 and the slidable window 11 define an air-letting opening 15 extending in a first dimension and a second dimension when the slidable window 11 is displaced in the first direction 112 as generally depicted in FIGS. 3A and 5. The air-letting opening 15 has an air-letting area defined as the product of an opening length 16 and a variable opening width 17 as generally depicted and referenced in FIG. 5. In the illustrated example, the first dimension extends along the X axis 106 and the second dimension extends along the Y axis 107. The slidable window 11 is displaceable in a first direction 112 and a second direction 113 relative to the window frame 12 along at least one of the first and second dimensions within the interior window channel 14 so as to increase or maximize the air-letting area of the air-letting opening 15 or decrease or minimize the air-letting area of the air-letting opening 15. The second direction 113 is depicted and referenced in FIGS. 8, 15 and 16 for comparison purposes.

Referencing FIG. 4, the reader will there consider the slidable window assembly 10 in a fully closed configuration such that there is no air-letting opening with an air-letting area of zero. Comparatively referencing FIG. 5, the reader will there consider the slidable window 11 being directed in the first direction 112 relative to the fixed window 11'. In some embodiments, the air-letting area of the air-letting opening 15 has a value dependent on a fixed opening length 16 extending along the Y axis 107 and the variable opening width 17 extending along the X axis 106 as in the case of a horizontally oriented slidable window assembly 10 as generally depicted in FIG. 1. In some embodiments, the air-letting area of the air-letting opening 15 is value-dependent on a variable opening height 18 extending along the Y axis 107 and a fixed opening width 19 as in the case of a vertically oriented slidable window assembly 10 as generally depicted in FIGS. 3 and 3A.

In some embodiments, the exterior window channel 13 and the interior window channel 14 each have a uniform channel width 22. In some embodiments the exterior window channel 13 comprises an insert-receiving channel 21 and in some embodiments the interior window channel 14 comprises an insert-receiving channel 21. In some embodiments, both the exterior window channel 13 and the interior window channel 14 may comprise insert-receiving channels 21 as illustrated. In the illustrations provided in FIGS. 15 and 16, the exterior window channel 13 shows a window insert arrangement 31 received in the insert-receiving channel 21 and the interior window channel 14 is shown as an insert-free insert-receiving channel 21. The slidable window 11, as illustrated, comprises a window thickness 45 less than the channel width 22 of the interior window channel 14 for enabling the slidable window 11 to be displaceable therewithin in the first direction 112 and the second direction 113.

In some embodiments, the window frame 12 comprises a raised, channel-defining divider portion 32, raised channel portions 33, a channel-defining exterior portion 34, a channel-defining interior portion 35, and a channel bottom 36. The raised channel portions 33 extend in parallel relation to the insert-receiving channels 21. In the case of the exterior window channel 13, the insert-receiving channel 21 extends intermediate the channel-defining exterior portion 34 and the raised channel portion 33. In the case of the interior window channel 14, the insert-receiving channel 21 extends intermediate the channel-defining divider portion 32 and the raised channel portion 33. In some embodiments, the insert-receiving channels 21 each comprise a uniform insert channel width 37 and the raised channel portions 33 comprise a uniform raised channel width 38. The insert channel width 37 and the raised channel width 38 sum to the channel width 22. The insert-receiving channels 21 have an insert channel depth 39 and the raised channel portions 33 have a raised channel depth 40 measured relative to an upper end 41 of the channel-defining divider portion 32. The insert channel depth 39 is greater than the raised channel depth 40 as comparatively depicted in FIG. 13.

The window insert arrangement 31 according to the presently disclosed subject matter comprises a rectangular panel 23 and a plurality of mountable panel spacers 24. In some embodiments, the rectangular panel 23 may be formed from a clear acrylic plexiglass material. The rectangular panel 23 comprises four corners 25, four edges 26, and a panel thickness 27. In some embodiments, the panel thickness may be ⅛ inch, 3/16 inch or % inch. In some applications, the 3/16 inch and % inch thick material provides for a more robust air-blocking panel 23 and may be preferred particularly for resisting or blocking relatively strong airflow 110 through the air-letting opening 15, as for example, during relatively windy conditions.

The four edges 26 of the rectangular panel 23 define a panel area the value of which is the product of a panel length 28 and a panel width 29 of the rectangular panel 23. The panel width 29 extends intermediate a first or outer panel edge 41 and a second or inner panel edge 42 of the panel edges 26. The panel length 28 extends intermediate a third or top panel edge 43 and a fourth or bottom panel edge 44. In some embodiments, the panel length 28 is greater than the panel width 29. Referencing FIG. 9, the reader will there consider a transverse panel plane 115 that extends midway of the panel length 28. In some embodiments, each of the panel halves about the transverse panel plane 115 have a length greater than the panel width 29. In some applications, the panel length 28 and the panel width 29 of the rectangular panel 23 may vary as dependent on the dimensions of the slidable window 11. For example, the panel length 28 may be 45% inches and the panel width may be 12 inches in some applications.

In some embodiments, the panel spacers 24 are formed from a self-adhesive felt or resiliently actuable material. In this regard, the panel spacers 24 may each comprise an upper spacer layer 47 and an adhesive layer 48 as depicted and referenced in FIGS. 12A and 12B. The panel spacers 24 are attached to the rectangular panel 23 at least at the four corners 25 for increasing an effective overall insert thickness 80 of the window insert arrangement 31. In some embodiments, the panel spacers 24 are adhesively mounted at the four corners 25. In other words, the panel spacers 24 each have at least a relaxed spacer thickness 46. The relaxed spacer thickness 46 together with the panel thickness 27 provide the overall insert thickness 80 equal the insert channel width 37 in some embodiments. In some embodiments. The window insert arrangement 31 is insertable into the insert-receiving channel 21 of the exterior window channel 13 in some embodiments adjacent the raised channel portion 33 thereof.

In some applications, the plurality of spacer elements 24 number at least four as, for example, when mounting the panel spacers 24 at the four corners 25. In some applications, the plurality of spacer elements 24 may number at least eight and comprise an array of outer or exterior spacer elements 49 and an array of inner or interior spacer elements 50. The outer spacer elements 49 are attached to the four corners 25 at an exterior panel side 51 of the rectangular panel 23 and the inner spacer elements 50 are attached to the four corners 25 at an interior panel side 52 of the rectangular panel 23 in some applications. In these applications, the panel spacers 24 are attached to the rectangular panel 23 at least at the four corners 25 for increasing an effective or overall insert thickness 80 of the window insert arrangement 31. The relaxed spacer thicknesses 46 of the outer spacer elements 49 and the inner spacer elements 50 together with the panel thickness 27 equal the insert channel width 37 and the overall insert thickness 80 in some embodiments.

In some applications, the plurality of spacer elements 24 may comprise at least one mid-length spacer element 54. In some applications, the plurality of spacer elements 24 may comprise at least one mid-length spacer element 54 attachable to the rectangular panel 23 at each of the exterior panel side 51 and the interior panel side 52. In these applications, the at least one mid-length spacer element 54 or opposed spacer elements 54 are is/are attachable at the first panel edge 41 intermediate the third and fourth panel edges 43 and 44. In some embodiments, the mid-length spacer element(s) 54 are attachable to the panel 23 at the transverse panel plane 115 equidistant from the third panel edge 43 and the fourth panel edge 44.

In some embodiments the panel spacers 24 may be formed from a resiliently actuable material. In this regard, the panel spacers 24 may be resiliently actuated as at arrow 114 into an actuated configuration for providing an actuated spacer thickness 53. Once inserted into the insert-receiving channel 21, the resiliently actuable material of the panel spacers 24 may resiliently return toward the relaxed spacer thickness 46 so as to secure or hold the window insert arrangement 31 in position within the insert-receiving channel 21.

Figure 9:
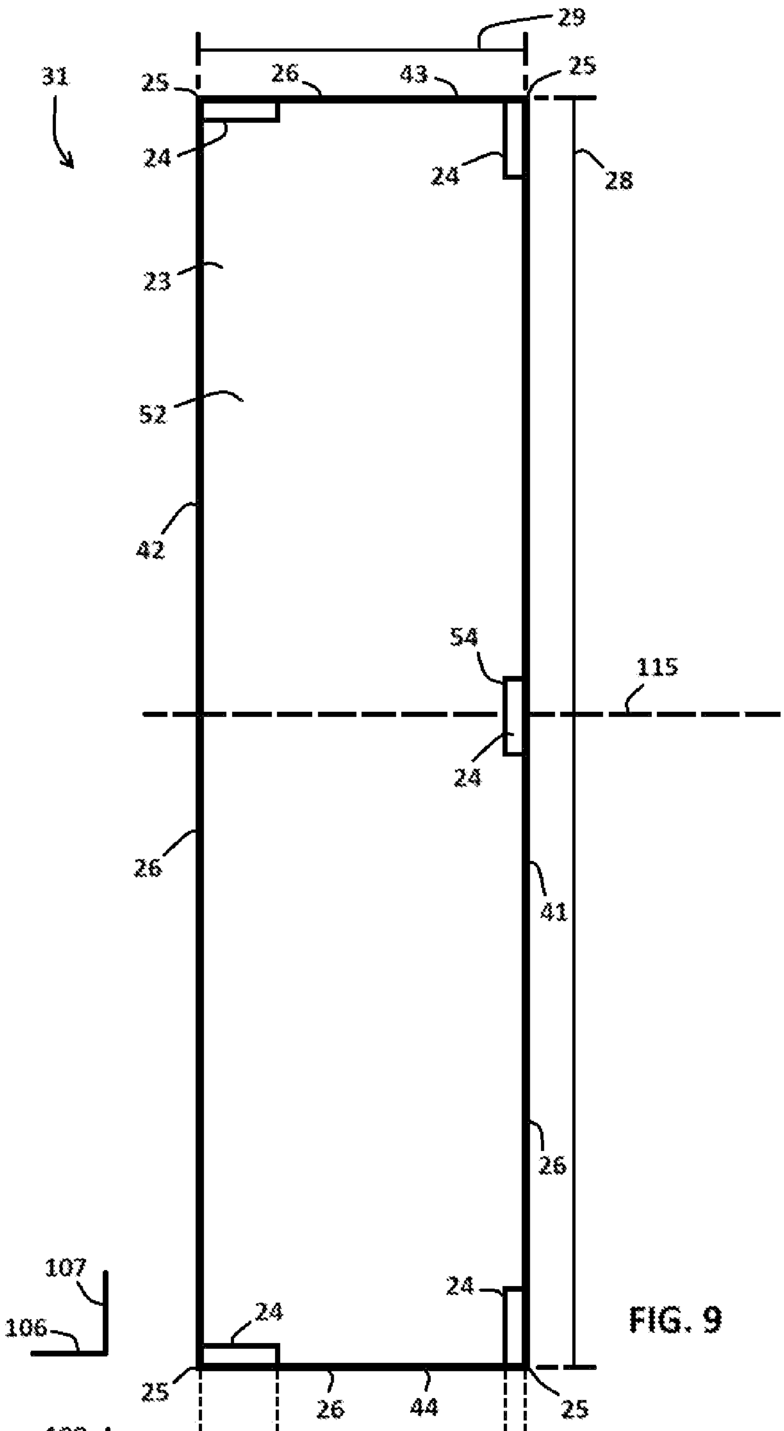
FIG. 9 is a two-dimensional diagrammatic interior elevational depiction of the window insert arrangement according to the presently disclosed subject matter.
Figure 9A:
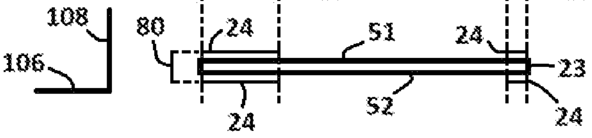
FIG. 9A is a two-dimensional diagrammatic top edge depiction of the window insert arrangement otherwise depicted in FIG. 9 according to the presently disclosed subject matter.
Figure 10:
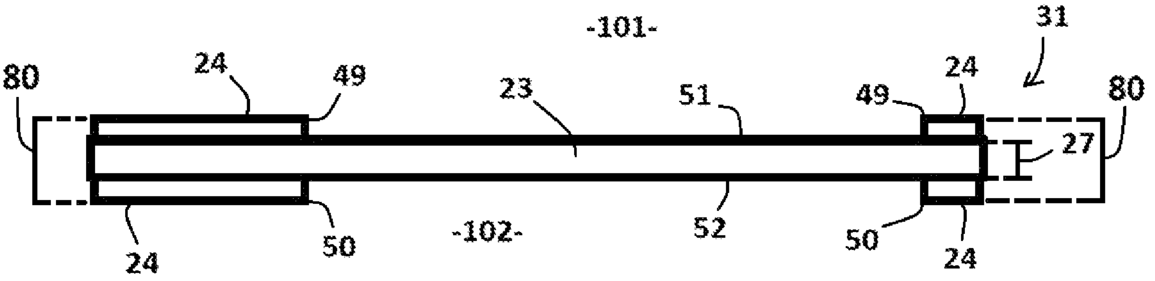
FIG. 10 is an enlarged, two-dimensional diagrammatic top edge depiction of the window insert arrangement otherwise depicted in FIG. 9 enlarged to depict in greater detail the structural relationship of an array of panel spacers relative to a panel member with panel thickness of the window insert arrangement according to the presently disclosed subject matter.
Figure 11A:
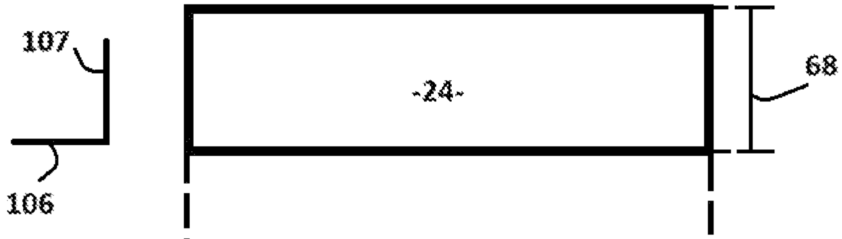
FIG. 11A is an enlarged, two-dimensional diagrammatic elevational depiction of a panel spacer according to the presently disclosed subject matter, enlarged to depict show in greater detail a spacer length and a spacer width of the panel spacer aligned as viewed along a first viewpoint axis in vertical alignment with alternative viewpoint axes as otherwise depicted in FIGS. 11B and 11C.
Figure 11B:
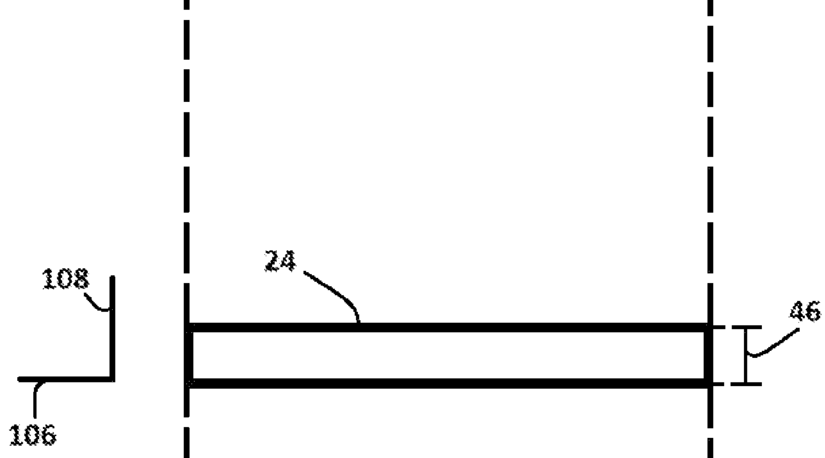
FIG. 11B is an enlarged, two-dimensional diagrammatic edge depiction of the panel spacer otherwise depicted in FIG. 11A, enlarged to depict in greater detail a relaxed spacer thickness and the spacer width of the panel spacer as viewed along a second viewpoint axis orthogonal to the first viewpoint axis in vertical alignment with alternative viewpoint axes as otherwise depicted in FIGS. 11A and 11C.
Figure 11C:
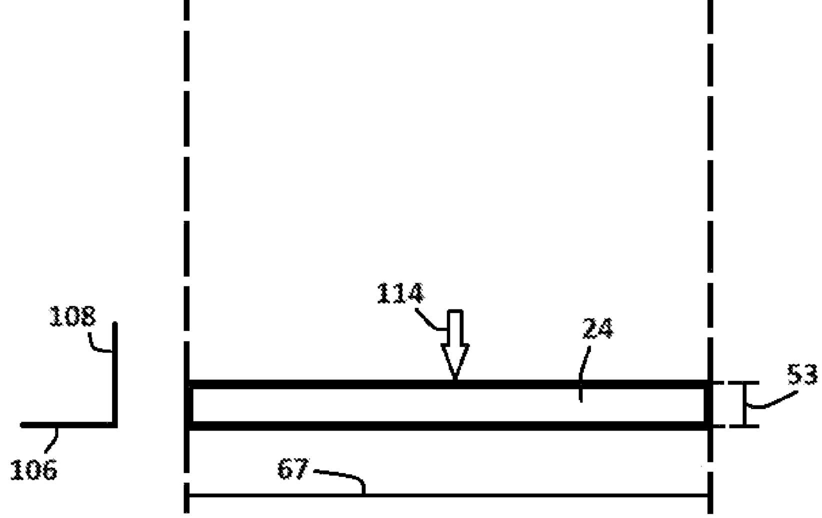
FIG. 11C is an enlarged, two-dimensional diagrammatic edge depiction of the panel spacer otherwise depicted in FIG. 11B, enlarged to depict in greater detail an actuated spacer thickness and the spacer width of the panel spacer as viewed along the second viewpoint axis orthogonal to the first viewpoint axis in vertical alignment with alternative viewpoint axes as otherwise depicted in FIGS. 11A and 11B.

In some embodiments, the panel spacers 24 each comprise a spacer length 67 and a spacer width 68 as comparatively depicted and referenced in FIGS. 11A through 11C. In some applications, the panel spacers 24 at the corners 25 of the first panel edge 41 may be oriented lengthwise in parallel relation to the first panel edge 41. In some applications, the panel spacers 24 at the corners 25 of the second panel edge 42 may be oriented lengthwise relative to the third panel edge 43 and the fourth panel edge 44 as generally depicted in FIG. 9. In other words, the panel spacers 24 each comprise a spacer length 67 and a spacer width 68. The panel spacers at the corners 24 of the first panel edge 41 are aligned lengthwise thereat, and the panel spacers 24 at the corners 24 of the second panel edge 42 are aligned lengthwise along the third panel edge 43 and the fourth panel edge 44 in some embodiments.

The first panel edge 41 and the second panel edge 42 together with the channel-defining exterior portion 34 and the channel-defining interior portion 35 define an air-blocking area extending in the first and second dimensions, which air-blocking area is lesser than the panel area. The air-blocking area reduces the effective air-letting area of the air-letting opening 15 to a reduced air-letting opening 55 thereby reducing airflow 110 through the air-letting opening 15 for reductively ventilating the room 100 as comparatively depicted in FIGS. 5-7A. In some applications, the window insert arrangement 31 is displaceable in the first direction 112 and the second direction 113 along at least one of the first and second dimensions within the insert-receiving channel 21 so as to shift or displace the reduced, air-letting opening 55 along at least one of the first and second dimensions. In the illustrated embodiments, the reduced air-letting opening 55 comprises a variable opening width 60 depending on the placement of the window insert arrangement 31 and a fixed opening height that corresponds to the opening length 16.

Figures 6, 6A:
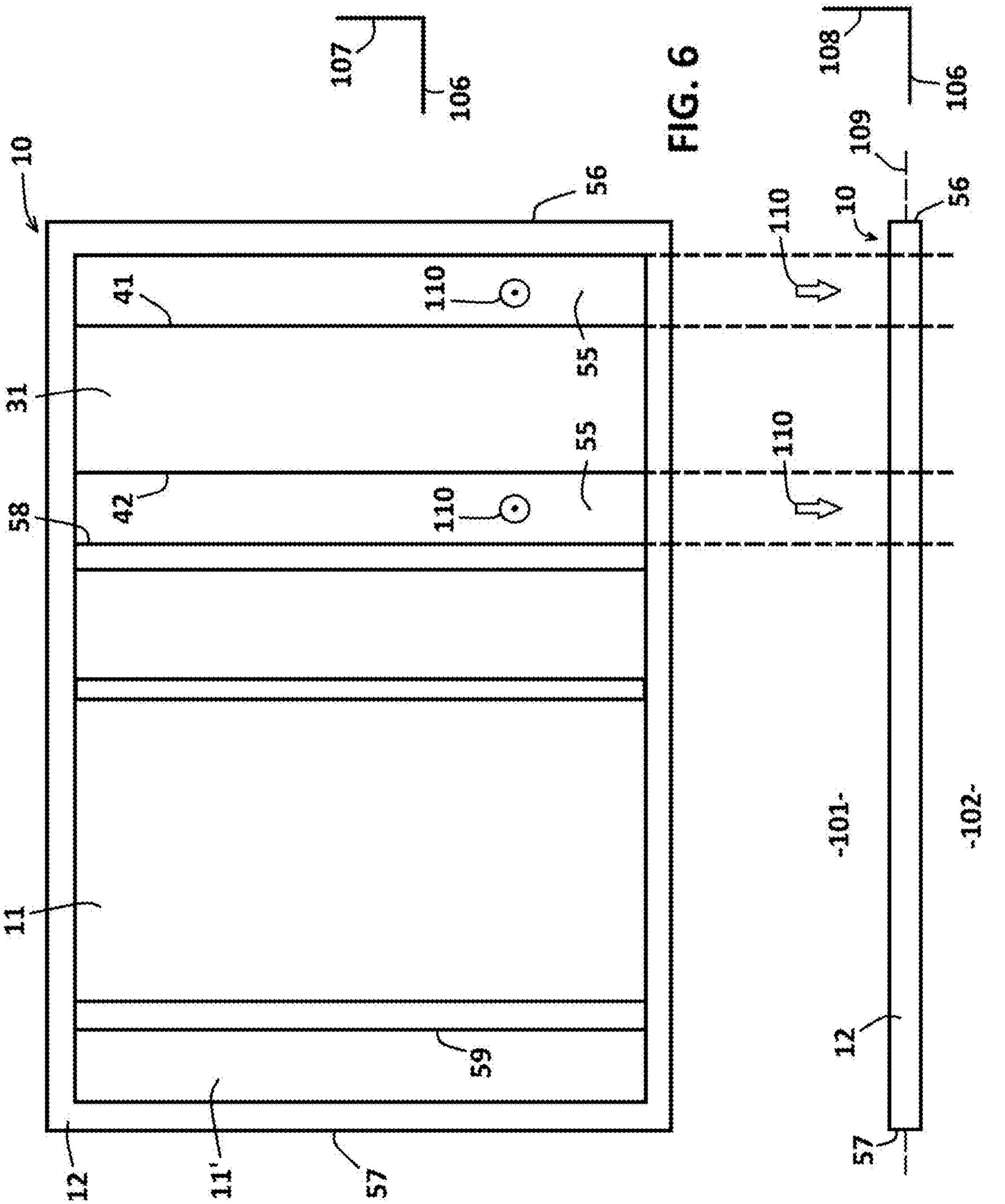
FIG. 6 is a third sequential two-dimensional diagrammatic depiction of the horizontally oriented slidable window assembly otherwise depicted in FIG. 5 as viewed along the first viewpoint axis depicting the slidable window assembly in an open configuration and depicting dual airflow pathways around a centrally installed window insert arrangement according to the presently disclosed subject matter.
FIG. 6A is a two-dimensional diagrammatic depiction of the horizontally oriented slidable window assembly otherwise depicted in FIG. 6 as viewed along a second viewpoint axis orthogonal to the first viewpoint axis according to the presently disclosed subject matter.
Figures 7, 7A:
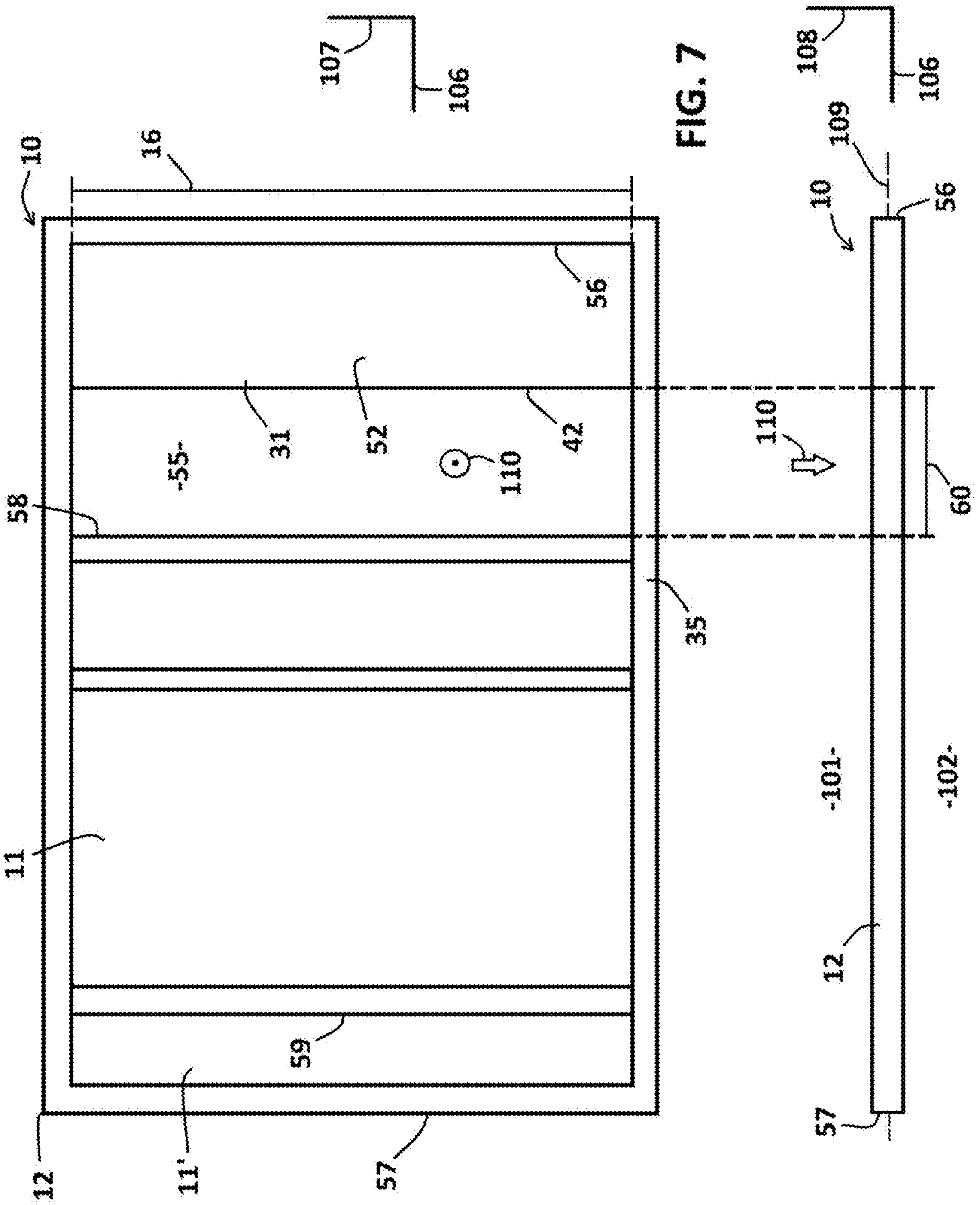
FIG. 7 is a fourth sequential two-dimensional diagrammatic depiction of the horizontally oriented slidable window assembly otherwise depicted in FIG. 6 as viewed along the first viewpoint axis depicting the slidable window assembly in an open configuration and depicting a single airflow pathway through a reduced, air-letting opening formed by installation of the window insert arrangement against a first frame edge of the slidable window assembly according to the presently disclosed subject matter.
FIG. 7A is a two-dimensional diagrammatic depiction of the horizontally oriented slidable window assembly otherwise depicted in FIG. 7 as viewed along a second viewpoint axis orthogonal to the first viewpoint axis according to the presently disclosed subject matter.
Figures 8, 8A:
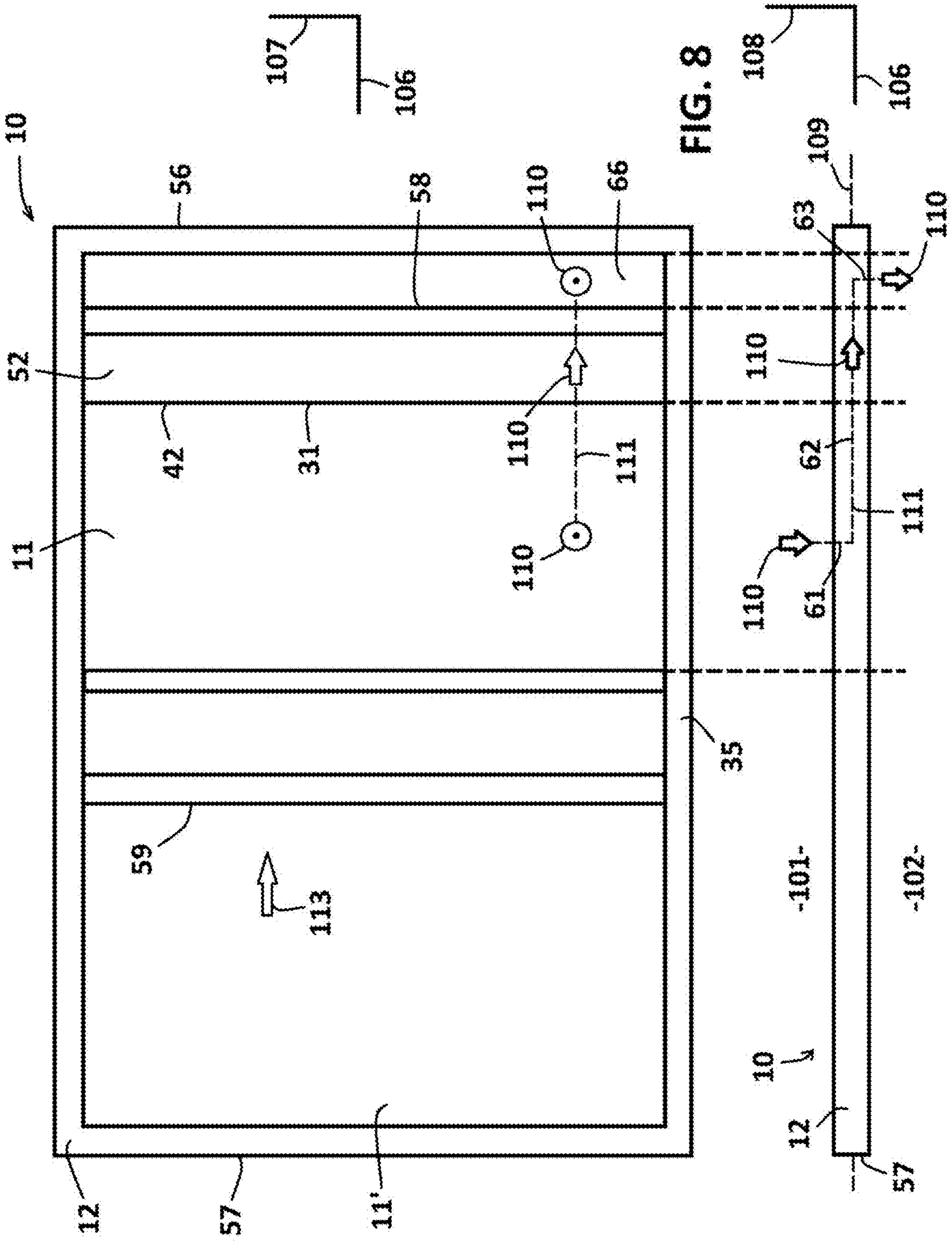
FIG. 8 is a fifth sequential two-dimensional diagrammatic depiction of the horizontally oriented slidable window assembly otherwise depicted in FIG. 7 as viewed along the first viewpoint axis depicting the slidable window assembly in a partially closed configuration and depicting an airflow diversion pathway from the reduced, air-letting opening in front of the window insert arrangement and out an airflow exit according to the presently disclosed subject matter.
FIG. 8A is a two-dimensional diagrammatic depiction of the horizontally oriented slidable window assembly otherwise depicted in FIG. 8 as viewed along a second viewpoint axis orthogonal to the first viewpoint axis and depicting the airflow diversion pathway from the reduced, air-letting opening in front of the window insert arrangement and out an airflow exit according to the presently disclosed subject matter.

In some applications, the air-blocking area of the window insert arrangement 31 is configured to be positioned centrally relative to the air-letting area of the air-letting opening 15 so as to provide opposed reduced, air-letting openings 55 adjacent the first panel edge 41 and the second panel edge 42 as generally depicted in FIGS. 6 and 6A. In some applications, the window frame 12 comprises a first frame edge 56 and a second frame edge 57 opposite the first frame edge 56. The first panel edge 41 may be directed in the first direction 112 and positioned against the first frame edge 56 for minimizing or closing a first (e.g., right-hand) reduced, air-letting opening 55 in FIG. 6 and effectively maximizing or opening a second (e.g., left-hand) reduced, air-letting opening 55 as comparatively depicted in FIG. 7.

In some applications, the slidable window 11 may comprise a first window edge 58 and a second window edge 59. In some applications, the first window edge 58 is displaceable toward the first panel edge 41 and the first frame edge 56 in the second direction 113 so as to provide an air diversion pathway 111 from the reduced air-letting opening 55 toward an airflow exit 66 between the first window edge 58 and the first frame edge 56. In some applications, the air diversion pathway 111 is adjustable by displacing at least one of the window insert arrangement 31 and the slidable window 11 along at least one of the first dimension and the second dimension.

In some applications, the air diversion pathway 111 comprises (1) an inlet pathway portion 61 directed along a third dimension orthogonal to the first and second dimensions; (2) a diverted pathway portion 62 firstly re-directed along at least one of the first and second dimensions; and (3) an outlet pathway portion 63 secondly re-directed along the third dimension. In the illustrated embodiment depicted in FIGS. 8, 8A, 16 and 17, for example, the inlet pathway portion 61 is directed along the Z axis 108, the diverted pathway portion 62 is directed along the X axis 106, and the outlet pathway portion 63 is directed along the Z axis 108.

The window ventilation arrangement 30 according to the presently disclosed subject matter provides a zig-zag air diversion pathway 111 in some applications. By diverting airflow 110 along this zig-zag air diversion pathway 111, external precipitation as diagrammatically depicted with water droplet 120 and other debris may be better prevented from entering the room interior 102. Referencing FIG. 17, for example, the reader will there consider precipitation 120 being directed as at arrow 116 against the exterior panel side 51 and directed downwardly as at arrow 117. The window ventilation arrangement 30 thereby allows a user to provide airflow 110 from the room exterior 101 to the room interior 102 while simultaneously preventing precipitation 120 and other external elements from entering the room interior 102. During a summer rain or winter snow storm, the user can open the slidable window 11 a couple of inches and water or snow is prevented from entering the room. Further, the window insert arrangement reduces noise from the room exterior 101.

Figure 17:
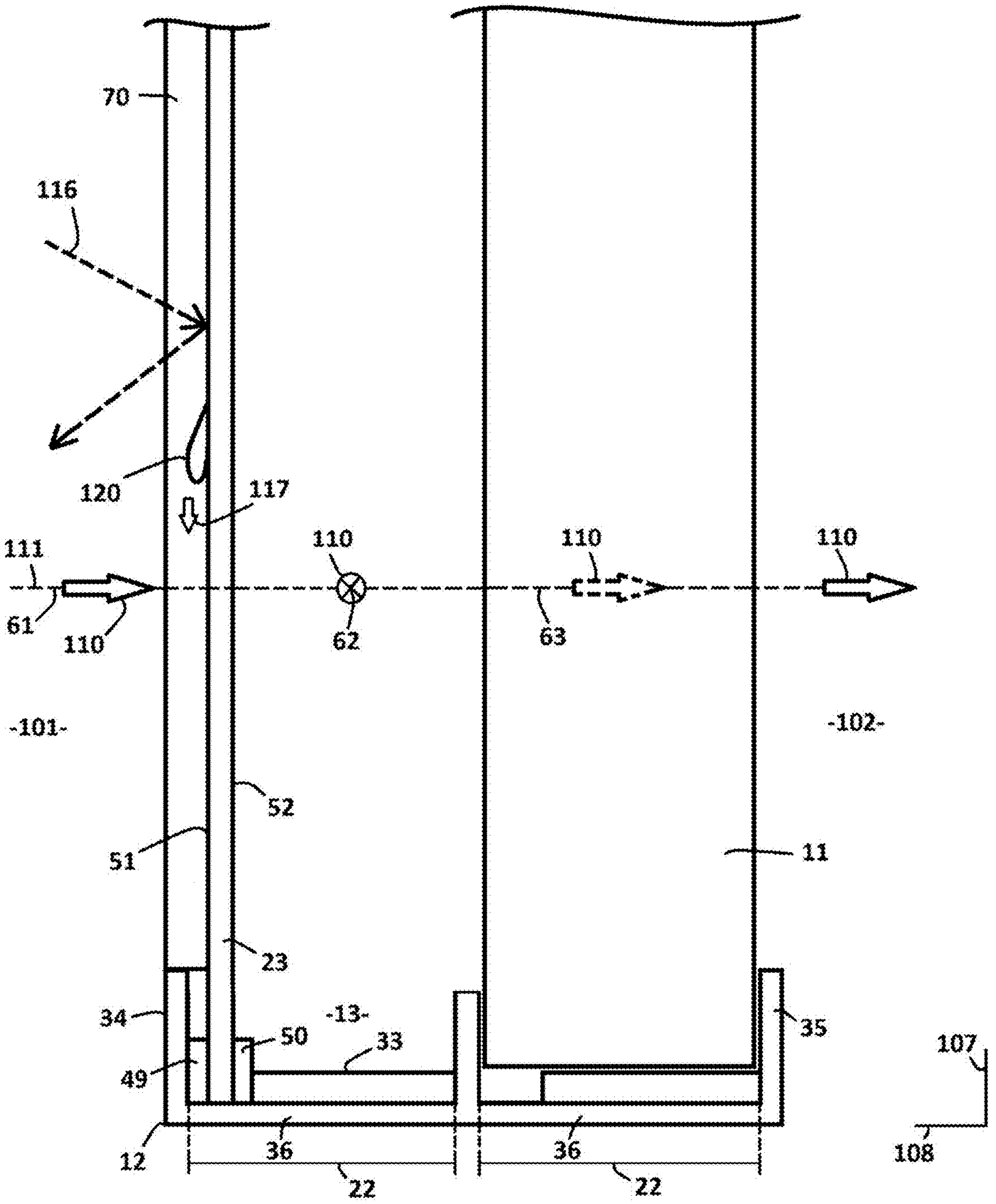
FIG. 17 is a fragmentary two-dimensional diagrammatic sectional depiction of lower portions of a slidable window assembly outfitted with a window ventilation arrangement according to the presently disclosed subject matter as viewed along the first viewpoint axis otherwise introduced in FIG. 13.

In this regard, the slidable window assembly 10 may further comprise at least one screen element 70 as depicted and referenced in FIG. 17. In some applications, the screen element 70 may be positioned adjacent the external window channel 13 at the room exterior 101. In some applications, the screen element 70 may be positioned in external adjacency to the window insert arrangement 31 as received in the insert-receiving channel 21 of the external window channel 13. If outfitted with a screen element 70, the slidable window assembly 10 may provide a better barrier against other intrusive bodies, such as insects and flying debris while also allowing airflow 110 to be directed from the room exterior 101 to the room interior 102 along the air diversion pathway 111.

In some embodiments, the window ventilation arrangement according to the presently disclosed subject matter comprises a plurality of insert spacers 64. The plurality of insert spacers 64 may be positioned at upper panel spacers 24 within a window channel portion 65 above the raised channel portion 33 at the first frame edge 56 for wedging the window insert arrangement 31 therewithin as comparatively depicted at the exterior window channel 13 and the interior window channel 14 in FIGS. 15 and 16. In other words, in some embodiments, the plurality of insert spacers 64 are configured to fit between the window insert arrangement 31 and upper portions of the channel-defining interior portion 35 to wedge and secure the window insert arrangement 31 within the window frame 12 at upper portions thereof.

Figure 15:
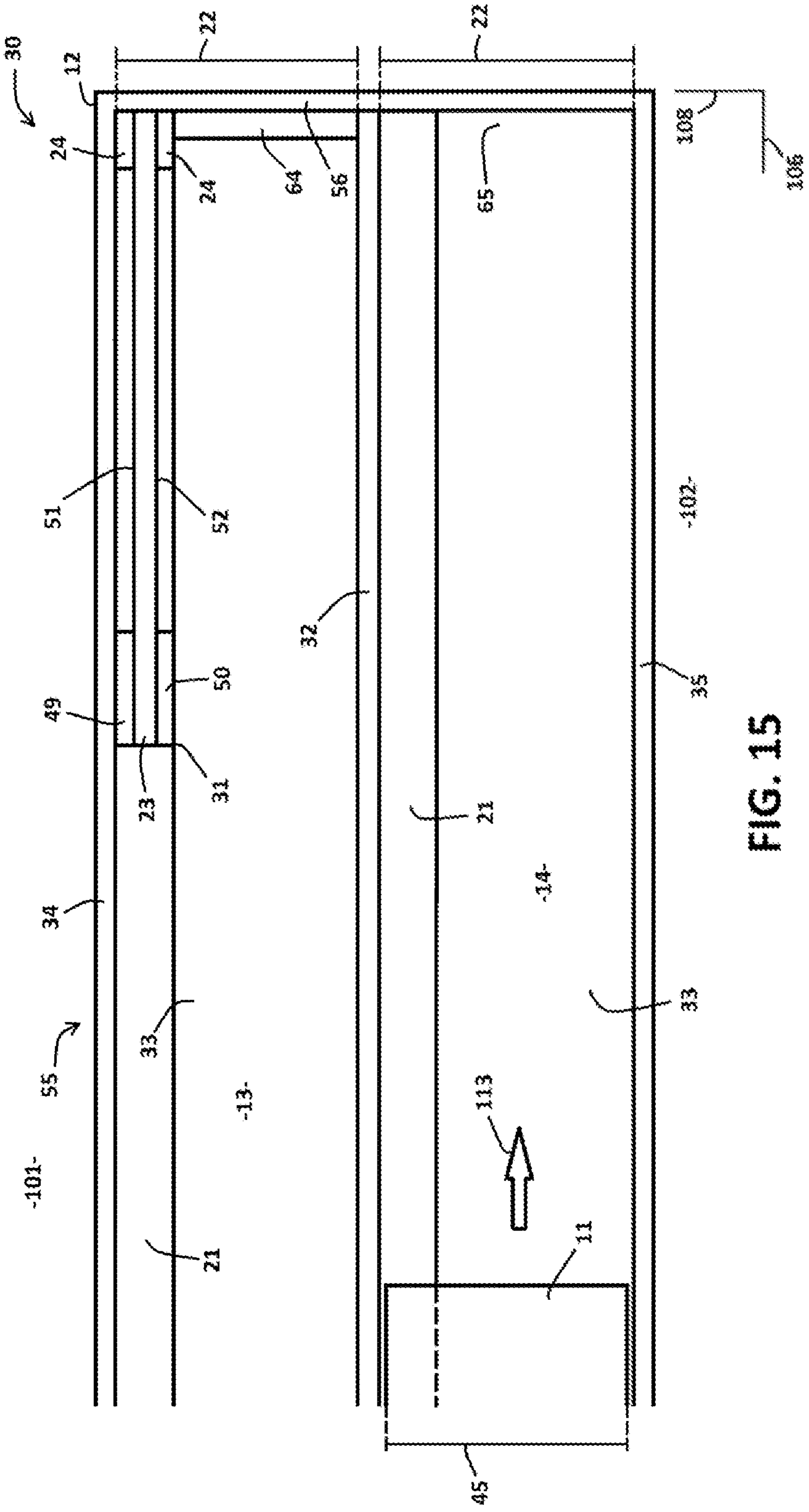
FIG. 15 is a first sequential enlarged, two-dimensional diagrammatic sectional depiction of a dual channel arrangement of a frame assembly of the slidable window assembly as viewed along a second viewpoint axis orthogonal to the first viewpoint axis depicted in FIGS. 13 and 14 before a slidable window is displaced toward a first frame edge of the slidable window assembly according to the presently disclosed subject matter.
Figure 16:
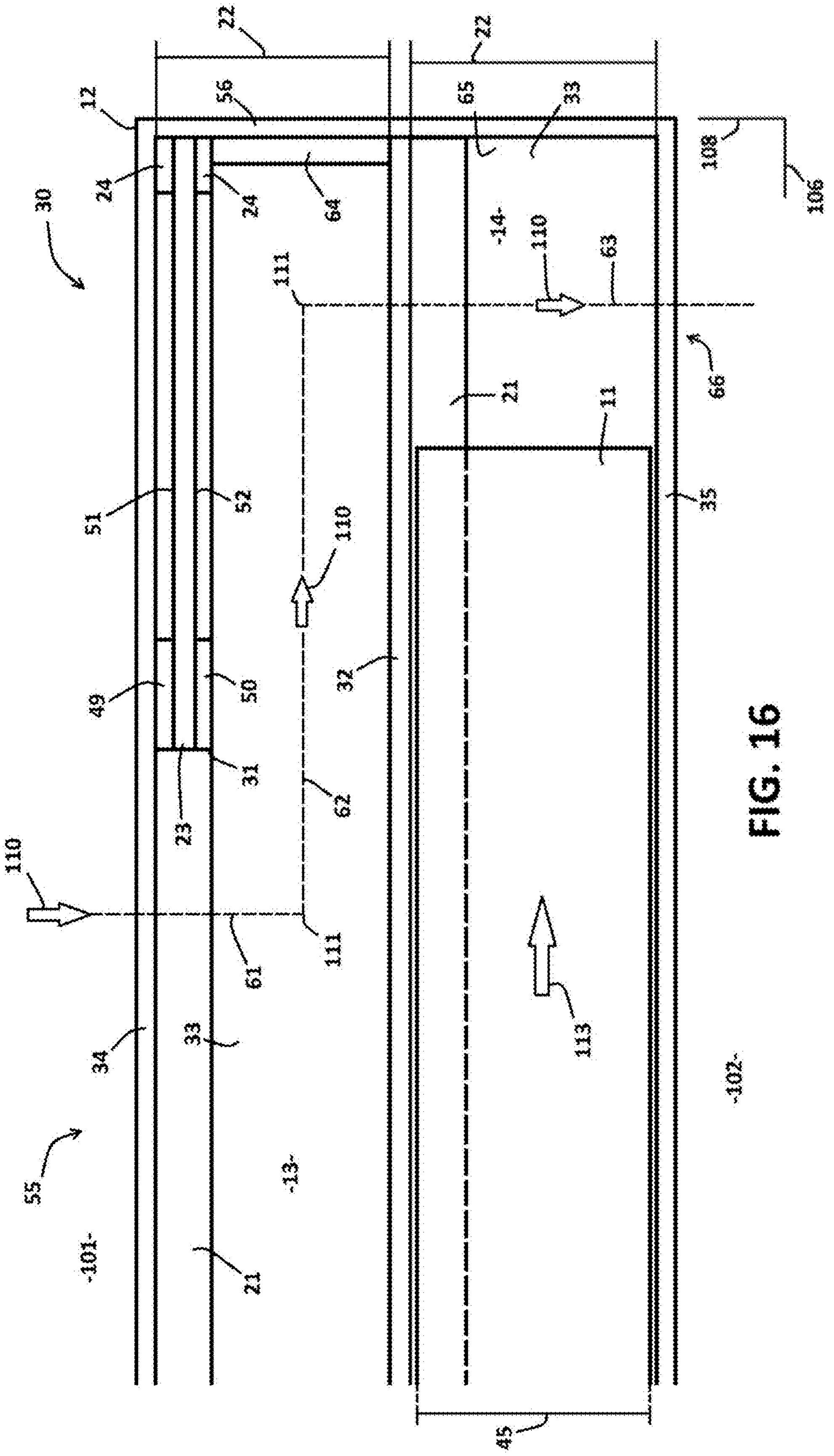
FIG. 16 is a second sequential enlarged, two-dimensional diagrammatic sectional depiction of the dual channel arrangement otherwise depicted in FIG. 15 depicting the slidable window after being displaced toward the first frame edge of the slidable window assembly according to the presently disclosed subject matter.

FIGS. 15 and 16 are diagrammatic depictions of the window ventilation arrangement 30 according to the presently disclosed subject matter. The insert spacer 64 there depicted is configured to fit between the upper inner spacer elements 50 and upper portions of the channel-defining divider portion 32. In other embodiments, the plurality of insert spacers 64 are configured to fit between upper, inner spacer elements 50 and the channel-defining interior portion 35 (not specifically illustrated). These alternative applications are dependent upon whether the window insert arrangement 31 is inserted into the exterior window channel 13 or the interior window channel 14.

While the above descriptions contain much specificity, this specificity should not be construed as limitations on the scope of the invention, but rather as an exemplification of the invention. Accordingly, although the window ventilation arrangement and window insert arrangement has been described by reference to a number of different structural features and functions, it is not intended that the novel aspects be limited thereby, but that modifications thereof are intended to be included as falling within the broad scope and spirit of the foregoing disclosure, the appended drawings, and the following claims.

What is claimed is:

1. A window ventilation arrangement for ventilating a room, the window ventilation arrangement comprising:

a slidable window assembly comprising a window frame, a first window and a slidable window, the window frame comprising an exterior window channel, an interior window channel, a peripherally extending channel-defining exterior portion, a peripherally extending channel-defining interior portion and a channel bottom;

the exterior and interior window channels each comprising a window channel portion, the window channel portions each comprising an insert-receiving channel at the channel bottom and a raised channel portion extending upwardly from the channel bottom;

a first window channel of the exterior and interior window channels being configured to provide an air-letting opening defined by the peripherally extending channel-defining exterior and interior portions, the first window received in the first window channel extending in a first dimension and a second dimension, the slidable window being slidably received a second window channel of the exterior and interior window channels and displaceable in a first direction and a second direction along at least one of the first and second dimensions within the second window channel for providing the air-letting opening or closing the air-letting opening, the insert-receiving channel of the first window channel having an insert channel width; and a removable window insert arrangement comprising a panel and a plurality of panel spacers, the panel comprising four corners, a first panel edge, a second panel edge opposite the first panel edge, and a panel thickness, the panel spacers each comprising a uniform spacer thickness and being attached to the panel at least at the four corners for providing an overall insert thickness at the first panel edge and the second panel edge, the overall insert thickness equaling the insert channel width, the window insert arrangement being removably insertable into the insert-receiving channel of the first window channel extending in parallel relation to the slidable window, the panel thereby providing a reduced air-letting opening for reductively ventilating the room.

2. The window ventilation arrangement according to claim 1, wherein the plurality of spacer elements numbers at least eight and comprises an array of outer spacer elements and an array of inner spacer elements, the outer spacer elements being attached to the four corners at an exterior panel side of the panel and the inner spacer elements being attached to the four corners at an interior panel side of the panel.

3. The window ventilation arrangement according to claim 1, wherein the panel has a panel length and a panel width, the panel width extending intermediate the first panel edge and the second panel edge, the panel length extending intermediate a third panel edge and a fourth panel edge, the panel length being greater than the panel width.

4. The window ventilation arrangement according to claim 3, wherein the plurality of spacer elements comprises at least one mid-length spacer element, the at least one mid-length spacer element being attachable at the first panel edge intermediate the third and fourth panel edges.

5. The window ventilation arrangement according to claim 1, wherein the window insert arrangement is displaceable in the first direction and the second direction along at least one of the first and second dimensions within the insert-receiving channel of the first window channel so as to displace the reduced air-letting opening along at least one of the first and second dimensions.

6. The window ventilation arrangement according to claim 5, wherein the window frame comprises a first frame edge and a second frame edge opposite the first frame edge, a first panel edge of the panel being positionable against the first frame edge for maximizing the reduced, air-letting opening.

7. The window ventilation arrangement according to claim 6, wherein the slidable window comprises a first window edge, the first window edge being displaceable toward the first panel edge so as to provide an air diversion pathway from the reduced air-letting opening toward an air exit between the first window edge and the first frame edge.

8. The window ventilation arrangement according to claim 7, wherein the air diversion pathway is adjustable by displacing at least one of the window insert arrangement and the slidable window along at least one of the first dimension and the second dimension.

9. The window ventilation arrangement according to claim 6, wherein said panel spacers each comprise a uniform spacer length and a uniform spacer width, the panel spacers at the corners of the first panel edge being aligned lengthwise thereat, the panel spacers at the corners of a second panel edge being aligned lengthwise along a third panel edge and a fourth panel edge.

10. The window ventilation arrangement according to claim 9 comprising a plurality of insert spacers, the insert spacers being positioned at least in engagement with upper panel spacers of the plurality of panel spacers at the first frame edge for wedging the window insert arrangement thereat.

11. A window insert arrangement and slidable window assembly combination comprising:

a window insert and a slidable window assembly, the window insert comprising a panel and a plurality of panel spacers, the panel comprising four corners, four panel edges, a panel thickness, a panel length, and a panel width, the panel length and panel width defining an air-blocking area extending in a first dimension and a second dimension;

the panel spacers each comprising a uniform spacer thickness and being attachable to the panel at least at the four corners for providing an overall insert thickness thereat, the window insert arrangement being insertable into an insert-receiving channel of the slidable window assembly;

the insert-receiving channel extending in parallel relation to a slidable window of the slidable window assembly and being defined by (a) a channel-defining portion, (b) a raised channel portion, and (c) a channel bottom, the insert-receiving channel comprising an insert channel width intermediate the channel-defining portion and the raised channel portion;

the overall insert thickness equaling the insert channel width, the air-blocking area for reducing an air-letting area of the slidable window assembly to a reduced, air-letting opening for reducing airflow through the air-letting area and for reductively ventilating a room having the slidable window assembly.

12. The window insert arrangement and slidable window assembly combination according to claim 11, wherein the plurality of spacer elements numbers at least eight and comprises an array of outer spacer elements and an array of inner spacer elements, the outer spacer elements being attachable to the four corners at an exterior panel side of the panel and the inner spacer elements being attachable to the four corners at an interior panel side of the panel.

13. The window insert arrangement and slidable window assembly combination according to claim 11, wherein the panel width extends intermediate a first panel edge and a second panel edge of the four panel edges, the panel length extending intermediate a third panel edge and a fourth panel edge of the four panel edges, the panel length being greater than the panel width.

14. The window insert arrangement and slidable window assembly combination according to claim 13, wherein the plurality of spacer elements comprises at least one mid-length spacer element, the at least one mid-length spacer element being attachable at the first panel edge intermediate the third and fourth panel edges.

15. The window insert arrangement and slidable window assembly combination according to claim 11, wherein the window insert arrangement is displaceable in a first direction and a second direction along at least one of the first and second dimensions within the insert-receiving channel in parallel relation to the slidable window so as to displace the reduced air-letting opening along at least one of the first and second dimensions.

16. The window insert arrangement and slidable window assembly combination according to claim 15, wherein the slidable window assembly comprises a window frame, the window frame comprising a first frame edge and a second frame edge opposite the first frame edge, a first panel edge of the panel being positionable against the first frame edge for maximizing the reduced, air-letting opening.

17. The window insert arrangement and slidable window assembly combination according to claim 16, wherein the slidable window assembly comprises a slidable window having a first window edge, the first window edge being displaceable toward the first panel edge so as to provide an air diversion pathway from the reduced air-letting opening toward an air exit between the first window edge and the first frame edge.

18. The window insert arrangement and slidable window assembly combination according to claim 17, wherein the air diversion pathway is adjustable by displacing at least one of the window insert arrangement and the slidable window along at least one of the first dimension and the second dimension.

19. The window insert arrangement and slidable window assembly combination according to claim 16, wherein said panel spacers each comprise a uniform spacer length and a uniform spacer width, the panel spacers at the corners of the first panel edge being aligned lengthwise thereat, the panel spacers at the corners of a second panel edge being aligned lengthwise along a third panel edge and a fourth panel edge.

20. The window insert arrangement and slidable window assembly combination according to claim 19 comprising a plurality of insert spacers, the insert spacers being positionable at least in engagement with upper panel spacers of the plurality of panel spacers at the first frame edge for wedging the window insert arrangement thereat.

21. The window ventilation arrangement according to claim 1, wherein the plurality of spacer elements are formed from a resiliently actuable material and are resiliently actuable intermediate an actuated spacer thickness and a relaxed spacer thickness, the resiliently actuable material being configured to resiliently return toward the relaxed insert thickness so as to hold the window insert arrangement in position within the insert-receiving channel.

22. The window insert arrangement and slidable window assembly combination according to claim 11, wherein the plurality of spacer elements are formed from a resiliently actuable material and are resiliently actuable intermediate an actuated spacer thickness and a relaxed spacer thickness, the resiliently actuable material being configured to resiliently return toward the relaxed insert thickness so as to hold the window insert arrangement in position within the insert-receiving channel.

* * * * *